US008781446B2

(12) United States Patent
Lazaridis et al.

(10) Patent No.: US 8,781,446 B2
(45) Date of Patent: Jul. 15, 2014

(54) METHOD AND SYSTEM FOR DATA EXCHANGE WHEN A CALL IS ESTABLISHED ON A NON-CLASS A CELLULAR ENDPOINT

(75) Inventors: Mihal Lazaridis, Waterloo (CA); Theron Dodson, Upton, MA (US); Doug Gisby, Atlanta, GA (US); David P. Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 810 days.

(21) Appl. No.: 12/027,429

(22) Filed: Feb. 7, 2008

(65) Prior Publication Data
US 2009/0203360 A1 Aug. 13, 2009

(51) Int. Cl.
*H04M 3/42* (2006.01)
*H04M 11/00* (2006.01)

(52) U.S. Cl.
USPC ............... 455/414.1; 379/93.05; 379/93.09

(58) Field of Classification Search
USPC .......... 455/414.1, 414.3; 379/93.05–93.07, 379/93.09
See application file for complete search history.

(56) References Cited

U.S. PATENT DOCUMENTS

| 5,533,108 | A * | 7/1996 | Harris et al. ............. 379/211.02 |
| 5,764,736 | A * | 6/1998 | Shachar et al. ............ 379/93.09 |
| 6,975,710 | B2 * | 12/2005 | Fujino et al. .............. 379/93.09 |
| 7,149,293 | B1 * | 12/2006 | Coppage et al. ........... 379/114.2 |
| 7,539,186 | B2 * | 5/2009 | Aerrabotu et al. ............ 370/389 |
| 2002/0155848 | A1 * | 10/2002 | Suryanarayana ............ 455/466 |
| 2002/0198019 | A1 * | 12/2002 | Naim et al. .................. 455/552 |
| 2004/0203937 | A1 * | 10/2004 | Mauro, II .................... 455/464 |
| 2005/0124326 | A1 | 6/2005 | Belkin et al. |
| 2006/0058032 | A1 | 3/2006 | Pearce et al. |
| 2006/0121902 | A1 | 6/2006 | Jagadeesan et al. |

(Continued)

FOREIGN PATENT DOCUMENTS

| KR | 2003057745 A * 7/2003 ............... H04Q 7/24 |
| WO | 2006/060794 A1 6/2006 |

OTHER PUBLICATIONS

"Digital cellular telecommunications system (Phase 2+); Universal Mobile Telecommunications System (UMTS); Voice Call Continuity (VCC) between Circuit Switched (CS) and IP Multimedia Subsystem (MS); Stage 2 (3GPP TS 23.206 version 7.5.0 Release 7); ETSI TS 123 206"; ETSI Standards, Lis, Sophia Antipolis Cedex, France, vol. 3-SA2, No. V7.5.0, Jan. 1, 2008, XP014040563, pp. cover and 1-37.

(Continued)

*Primary Examiner* — Kent Chang
*Assistant Examiner* — Scott Au
(74) *Attorney, Agent, or Firm* — Norton Rose Fulbright Canada LLP

(57) ABSTRACT

A telecommunication system and method that allow a data exchange to be initiated while a user is engaged in a voice communication using a non-class A endpoint (e.g., cellular telephone, personal digital assistant, etc.) with another party. One example method maintains a first voice communication leg to the wireless device and a second voice communication leg to the second device, inputs a request for the data exchange during the voice communication, disconnects the first voice communication leg, parks the second voice communication leg and waits for data to be transmitted to or from the wireless device. Once it is determined that the data exchange is complete, the method establishes a third voice communication leg to the wireless device, unparks the second voice communication leg and connects the second and third voice communication legs.

19 Claims, 15 Drawing Sheets

(56) References Cited

U.S. PATENT DOCUMENTS

2007/0003043 A1* 1/2007 Kapur .................. 379/211.02
2007/0047523 A1* 3/2007 Jiang ........................ 370/352
2008/0146256 A1* 6/2008 Hawkins et al. ............. 455/466
2010/0002861 A1* 1/2010 Gao et al. .................. 379/207.16

OTHER PUBLICATIONS

Wise, Jeff, et al., "Method and apparatus for voice call handoff from CS to PS domains using a single transceiver"; Internet Citation, 2007 Motorola, Inc., XP007905472, pp. 1-4.

European Patent Office, Office Communication issued in relation to European Patent Application No. 08151184.2 dated Sep. 3, 2008.

Kilburn & Strode, Response to Office Communication issued in respect of European Patent Application No. 08151184.2, dated Jun. 12, 2009.

European Patent Office, Office Communication issued in relation to European Patent Application No. 08151184.2, dated Jul. 8, 2010.

Kilburn & Strode, Response to Office Communication issued in respect of European Patent Application No. 08151184.2, dated Dec. 7, 2010.

Canadian Intellectual Property Office, Office Communication issued in respect of Canadian Patent Application No. 2,653,221, dated Jun. 13, 2011.

Norton Rose, Response to Examination Report filed in respect of Canadian Patent Application No. 2,653,221, dated Dec. 1, 2011.

Canadian Intellectual Property Office, Examiner's Requisition dated Aug. 24, 2012, issued in Canadian Patent Application No. 2,653,221.

Canadian Intellectual Property Office, Examiner's Requisition Dated Dec. 17, 2013 issued on Canadian Patent Application No. 2,653,221.

* cited by examiner

METHOD AND SYSTEM FOR DATA EXCHANGE WHEN A CALL IS ESTABLISHED ON A NON-CLASS A CELLULAR ENDPOINT

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

BACKGROUND

It has become relatively common for individuals to possess a number of different devices through which they communicate. For example, a person may have a home telephone, a wireless telephone, a pager, a personal digital assistant (PDA), and an office telephone to name a few. Today, it is common for a mobile device such as a cellular telephone or PDA to include both cellular (i.e., circuit switching) and data (i.e., packet switching) services, providing the user with the ability to wirelessly transmit and receive voice and data from the same device.

Presently, GSM (Global System for Mobile communications) is the wireless technology used in most of the world's mobile/wireless telephone networks. GSM is digital cellular technology that allows the transmission and reception of voice and data. GSM also allows the transmission of basic data services such as e.g., SMS (Short Message Service). Because GSM is used in over 200 countries worldwide, a GSM compatible telephone/PDA can be used outside of the user's own country or region. This is a major advantage of GSM.

Almost all of today's GSM networks include the GPRS (General Packet Radio Service) service. GPRS is IP (Internet Protocol) based and supports a wide range of enterprise and consumer applications. GPRS improves wireless data throughput rates, allowing users to have similar access speeds as typically found in dial-up modems. GPRS users are provided with advanced data services such as e.g., color Internet browsing, e-mail, video streaming, multimedia messaging and location-based services to name a few.

Further enhancements to GSM networks are provided by EDGE (Enhanced Data rates for GSM Evolution) technology. EDGE provides up to three times the data capacity of GPRS. EDGE users are provided with advanced wireless/mobile services such as e.g., the ability to download video and music clips, full multimedia messaging, high-speed color Internet browsing and e-mail.

Other wireless technologies include iDEN (Integrated Digital Enhanced Network), Code Division Multiple Access (CDMA) and CDMA2000 to name a few. iDEN combines the capabilities of a digital cellular telephone, two-way radio, alphanumeric pager and data/fax modem in a single network. iDEN is based on a time division multiple access (TDMA) and GSM architecture. CDMA uses a spread spectrum approach where each conversation is digitized and then tagged with a code. CDMA conversations are "spread" when sent and subsequently reassembled upon reception. CDMA technology allows multiple calls to be carried over one channel. CDMA2000 is an evolution of CDMA designed for narrowband transmissions.

The class of the mobile device determines which of the above voice/data capabilities the device has and how the capabilities may be used. For example, class A mobile devices can be connected to both GPRS and GSM services simultaneously. These devices can transmit/receive GPRS-type data at the same time the user is having a voice communication. Class B mobile devices, on the other hand, can be connected to both GPRS and GSM services, but may only use one service at a time. Class B devices can place or receive voice calls, or place/receive an SMS message (i.e., text message). During voice calls or SMS messaging, GPRS services are suspended and then resumed automatically after the call or SMS session has ended. Class C mobile devices are connected to either GPRS or the GSM voice service. A user needs to manually switch between voice and data services using the class C device.

When a wireless/mobile device user is using a non-class A wireless/cellular endpoint (i.e., the user is using a non-class A mobile device) to have voice communications with another party, the user loses the ability to send and receive data other than using SMS messages (e.g., text messaging). If the user of the non-class A device wishes to send an e-mail or initiate another data transfer (e.g., Internet browsing, file download, etc.), the user must disconnect the current communication with the other party before doing so. Once the user sends and/or receives the desired data, the user must callback the other party to continue their conversation; this is inconvenient to both parties while also adding the expense associated with the additional voice call. There is also the possibility that the other party will become engaged in another conversation and will be unavailable for the return call. The inability to exchange data while a voice communication is ongoing using a non-class A wireless endpoint is a significant drawback in the industry since it is estimated that over 90% of mobile device users are using non-class A devices.

DETAILED DESCRIPTION OF THE INVENTION

Figure 1:
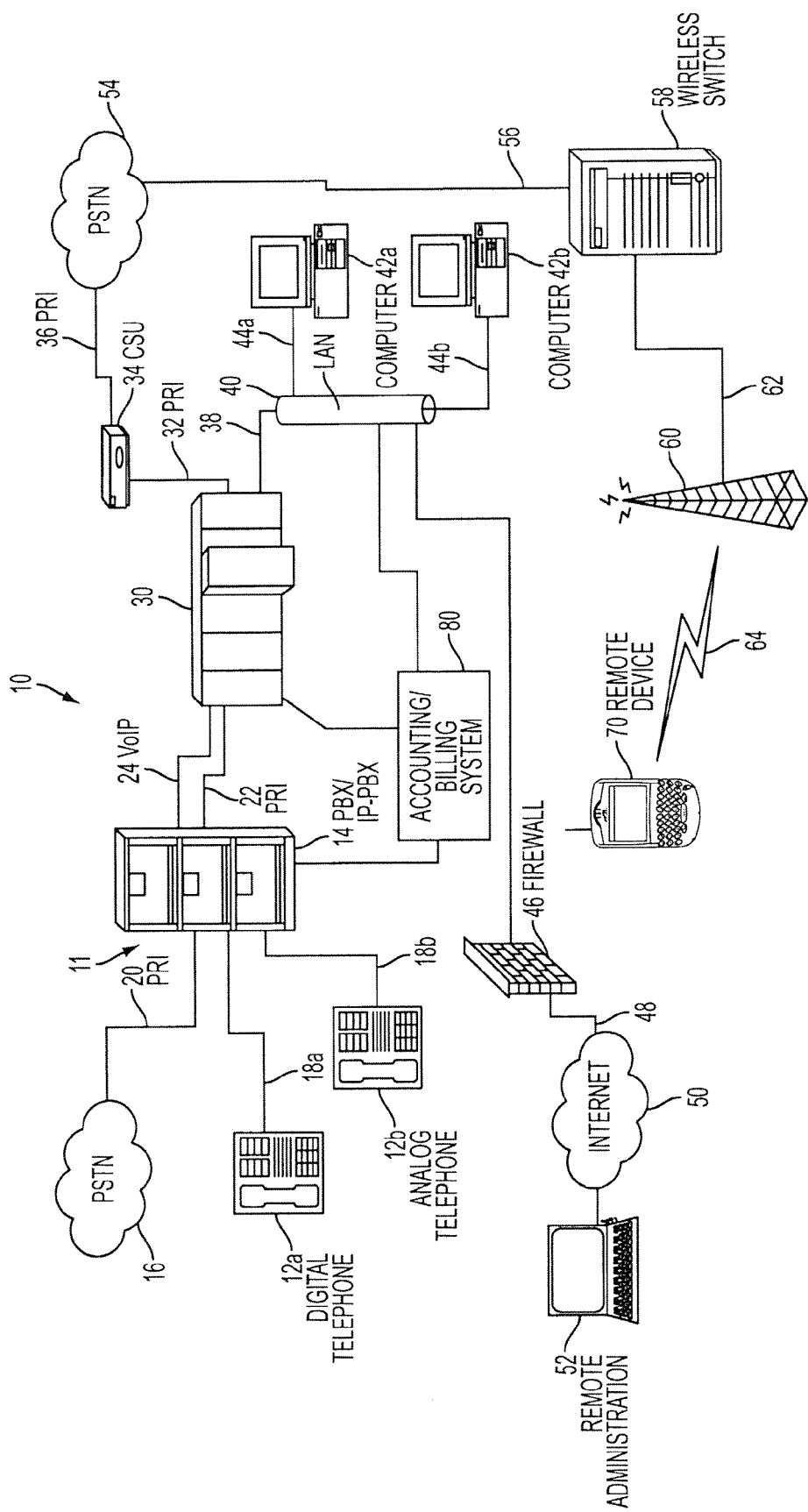
FIG. 1 illustrates an example of a telecommunication system constructed in accordance with an embodiment disclosed herein.

Example embodiments and applications will now be described. Other embodiments may be realized and structural or logical changes may be made to the disclosed embodiments. Although the embodiments disclosed herein have been particularly described as applied to a business or office environment, it should be readily apparent that the embodiments may be embodied for any use or application having the same or similar problems.

Specific embodiments and applications related to the following description include, but are not limited to, a method of initiating a data exchange for a wireless device participating in a voice communication with a second device, where the wireless device is a non-class A device. The method includes the steps of maintaining a first voice communication leg to the wireless device and a second voice communication leg to the second device and inputting a request for the data exchange during the voice communication. The method also includes the steps of disconnecting the first voice communication leg, parking the second voice communication leg, waiting for data to be transmitted to or from the wireless device and determining that the data exchange is complete. Once it is determined that the exchange is complete, the method establishes a third voice communication leg to the wireless device, unparks the second voice communication leg and connects the second and third voice communication legs.

An additional embodiment includes a method of initiating a data exchange from a wireless device participating in a voice communication with a second device, where the wireless device is a non-class A device. In this embodiment, the method comprises maintaining a first voice communication leg to the wireless device and a second voice communication leg to the second device, inputting a request for the data exchange from the wireless device during the voice communication and determining whether the wireless device has access rights to initiate the data exchange. If the wireless device has access rights to initiate the data exchange, the method comprises dropping the first voice communication leg, inputting a data exchange complete indication from the wireless device, establishing a third voice communication leg to the wireless device, and using the third voice communication leg to re-establish the voice communication with the second device.

As is described below, a telecommunication system is also provided. The system includes a computer readable storage medium having a database comprising a plurality of user profiles, each profile being associated with a respective telephone extension of the system and associating a respective wireless device to the respective extension, and a processor configured to initiate a data exchange for a first wireless device associated with a first telephone extension of the system while the first wireless device is participating in a voice communication with a second device, where the first wireless device is a non-class A device. The processor is configured to maintain a first voice communication leg to the first wireless device and a second voice communication leg to the second device, input a request for the data exchange, disconnect the first voice communication leg and park the second voice communication leg. The processor is configured to determine that the data exchange is complete and establish a third voice communication leg to the first wireless device when it is determined that the data exchange is complete, unpark the second voice communication leg, and connect the second and third voice communication legs.

Another embodiment provides a telecommunications server configured to initiate a data exchange for a wireless device associated with the server while the wireless device is participating in a voice communication with a second device, wherein the wireless device is a non-class A device. The server comprises a processor configured to initially maintain the voice communication between the wireless device and the second device, determine that a data exchange for the wireless device is being requested, alert the wireless device that the data exchange is being requested, input a response from the wireless device and determine from the response whether the wireless device will accept the data exchange. If the processor determines that the wireless device will accept the data exchange, the processor disables the voice communication between the wireless device and the second device, waits for data to be transmitted to the wireless device and determines when the data exchange is complete. Once it is determined that the exchange is complete, the processor re-establishes voice communication between the wireless device and the second device.

Another application and embodiment provides a telecommunications server configured to initiate a data exchange for a wireless device associated with the server while the wireless device is participating in a voice communication with a second device, wherein the wireless device is a non-class A device. The server comprises means for maintaining the voice communication between the wireless device and the second device, means for determining that a data exchange for the wireless device is being requested, means for alerting the wireless device that the data exchange is being requested, means for inputting a response from the wireless device and means for determining from the response that the wireless device will accept the data exchange. The server further comprises means for disabling the voice communication between the wireless device and the second device, means for waiting for data to be transmitted to the wireless device, means for determining when the data exchange is complete and means for re-establishing voice communications between the wireless device and the second device.

In another embodiment, a non-class A wireless device is provided. The wireless device comprises a processor for communicating with a second device using voice communications, for exchanging data with the second device and for controlling a graphical user interface. The device also includes a display and input means. The processor is configured to initiate a data exchange between the wireless device and the second device while the wireless device and the second device are communicating using the voice communications. The processor is configured to input a data exchange request from the interface as manipulated by the input means and is configured to transmit the request to a server computer associated with the wireless device. The processor is configured to transmit data to the second device and transmit a reconnect message input from the interface as manipulated by the input means.

A first example embodiment is discussed and illustrated with reference to its implementation within an office building, multiple office buildings or other enterprise establishment. In an office building, for example, personnel are assigned to offices (or cubicles) with each office having an associated telephone. The office telephones are typically connected to a PBX, exchange, or other call processing infrastructure. The PBX allows each office telephone to have its own telephone extension and a direct inward dial (DID) telephone number. As known in the art, a telephone extension is typically a three, four or five digit telephone number where station-to-station (i.e., office-to-office) calls can be placed by dialing the three, four or five digit extension. This is commonly referred to as direct extension dialing. As also known in the art, a DID telephone number allows external calls (i.e., calls initiated outside of the office PBX) to be placed directly to the office telephone.

The embodiments disclosed are not to be limited to any particular environment. The embodiments may be implemented, for example, in a hotel, boarding house, dormitory, apartment, or other commercial or residential establishment, where individuals are assigned to a unique extension or DID telephone number. The term "office" as used herein encompasses a singular room or space within a business, other enterprise, hotel room or similar facility. The term "user" as used herein encompasses office personnel, hotel guests or other individuals associated with a telephone extension and DID telephone number.

FIG. 1 illustrates a telecommunication system 10 constructed in accordance with an embodiment disclosed herein. As will be discussed below, the system 10 provides for a full integration of remote telephony devices, such as a remote device 70 (shown in this example as a personal digital assistant (PDA) with wireless voice and data communications (also referred to herein as a mobile device)), into an office, enterprise or hotel PBX or other communications network. The remote device 70 may be any suitable wirelessly enabled handheld remote device. The remote device 70 may be a dual mode (simultaneous data and voice communication capabilities) or single mode communication device, personal digital assistant, etc. such as the device 800 described in further detail below in relation to FIG. 8. Such devices include Blackberry™ devices by Research In Motion Limited of Ontario, Canada, or Palm® Treo™ devices by Palm, Inc. of California, U.S.A. to name a few. In addition, the remote device 70 may be a cellular telephone, etc.

The system 10 can selectively establish communications with one of a plurality of devices, including one or more remote devices 70, associated with a particular telephone extension or DID telephone number. Moreover, the system 10 will allow remote devices 70 such as a mobile device (described below in more detail) to perform functions of a standard office telephone 12a, 12b for both inbound and outbound communications. That is, a remote device 70 will be able to use features of the office network (e.g., direct extension dialing, corporate dialing plan, enterprise voicemail etc.) even though the device is not within the confines of the office or not directly connected to the office PBX. The system 10 also allows the remote device 70 to operate as an independent PDA, wireless telephone, etc., if so desired. That is, the remote device 70 may receive calls placed to its (non-office) DID telephone number even though the system 10 also routes PBX calls to the device 70. In addition, the system 10 essentially implements all or part of call management functions typically available on office, enterprise or hotel PBX or other communications network desktop telephone. Some of these features are discussed in detail below.

The system 10 as particularly illustrated herein includes a conventional office PBX network 11. The PBX network 11 may include a plurality of standard telephones 12a, 12b respectively connected to a conventional PBX/IP-PBX 14 via communication lines 18a, 18b. Although PBX network 11 may use a PBX or IP-PBX 14, the following disclosure will simply refer to PBX 14 for convenience purposes. The PBX 14 is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, the embodiments are not to be limited to the particular type of telephone used in the system 10.

The PBX 14 is coupled to a server 30 constructed in accordance with an embodiment discussed in more detail below. The server 30 is connected to the PBX 14 in this embodiment by a PRI connection 22, VoIP connection 24 (if PBX 14 is an IP-PBX), or other suitable communication medium (e.g., WiFi connection). The server 30 is also connected to a PSTN 54 by a PRI connection or other suitable digital communication medium. The illustrated PRI connection between the server 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the server 30 and the PSTN 54 is one of many suitable connections. Accordingly, the embodiments disclosed should not be limited to the illustrated connection. The server 30 is one of the mechanisms that allows the integration of remote devices (e.g., mobile device 70) into the PBX network 11 and its operation will be described below in more detail. Moreover the server 30 maintains control over inbound, outgoing and in-progress calls and communications.

The server 30 is preferably connected to a local area network (LAN) 40 by an appropriate communication medium 38. Although a LAN 40 is illustrated, it should be appreciated that any other network, be it wired or wireless or a combination thereof, could be used. A plurality of computers (e.g., 42a, 42b) may be respectively connected to the LAN 40 by any appropriate communication lines 44a, 44b. The computers 42a, 42b can be used by network administrators or others to maintain server 30 and other portions of the system 10. The LAN 40 may also be connected to the Internet 50 by a suitable communication medium 48. A firewall 46 may be used for security purposes. In accordance with an embodiment, Internet 50 can be used to allow a remote administration device 52 (e.g., a personal computer) to perform remote administration of server 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless remote device 70. The wireless remote device 70 could also be a pager, wireless telephone, cellular telephone, or other wireless communication device. It may be desirable for the remote device 70 to be capable of handling both (or either) digital and analog communication signals. It should be noted that any type of wireless communication protocol (or a combination of different protocols), such as TDMA, CDMA, GSM, AMPS, MSR, iDEN, WAP, WiFi, etc., could be used.

It should be appreciated that the server 30 is connected to a wireless carrier through a PSTN 54 and not by unique hardware or an in-office cellular network. As a result, server 30 only has to interface with conventional components, such as the PBX 14 and PSTN 54. Thus, the system 10 is substantially technology independent. Moreover, special wireless devices are not required, which allows the remote device 70 to function in its conventional manner (e.g., as a separate mobile device) and as part of the PBX network 11 (if so desired). The PSTN 54 e.g., will send calls placed to the DID phone numbers associated with the PBX extensions to the server 30 where the server 30 resolves the called number and performs the call processing described below.

The server 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the remote device 70 or other remote device. This immediate billing feature is not present in other PBX or enterprise networks and is particularly useful for corporate environments such as law firms and government agencies, and hotel environments, where up to date billing information is essential.

As noted above, the server 30 allows for the full integration of remote devices into the PBX network 11. In accordance with an embodiment, server 30 is a processor-based standalone unit capable of handling communications directed to the PBX network 11. In a first embodiment, shown in FIG. 2, server 30 comprises a plurality of receiving and transmitting modules 220a, 220b, 220c, first and second buses 275, 285, at least one processor module (Obj) 250, a network interface card 240 and a memory module operable to comprise a database 270 such as for example, a relational database management system (RDBMS). Further, server 30 can include a web-based user interface (UI) processor module 265, a SIP proxy server module 280 and a plurality of flop files 290a, 290b, 290c. The processor, UI and SIP proxy server modules 250, 265, 280 can be implemented, separately or together, as one or more processor cards (example hardware components of these cards are described below in more detail with reference to FIG. 4) containing source code, object modules, scripts, or other programming to perform the following functions.

The SIP proxy server module 280 receives session initiation protocol (SIP) messages from user agents and acts on their behalf in forwarding or responding to those messages. In essence, the SIP proxy server module 280 is a gateway for IP-based interfaces to the server 30. The SIP proxy server module 280 also adds services, features and scalability to SIP networks. The SIP proxy server module 280 typically includes a registration service and a SIP location database, in addition to the SIP proxy. Server 30 can receive an incoming call 210 and/or place an outgoing call 215 (described below in more detail). The processor module 250, among other things, directs and instructs the call processing of the server 30. The memory module comprising database 270 is used for storing user preferences and other pertinent information and may be a separate card or included within one of the other modules. The memory module may also be located external to the server 30, if desired, and connected to the server 30 by any wired or wireless communication medium.

Figure 4:
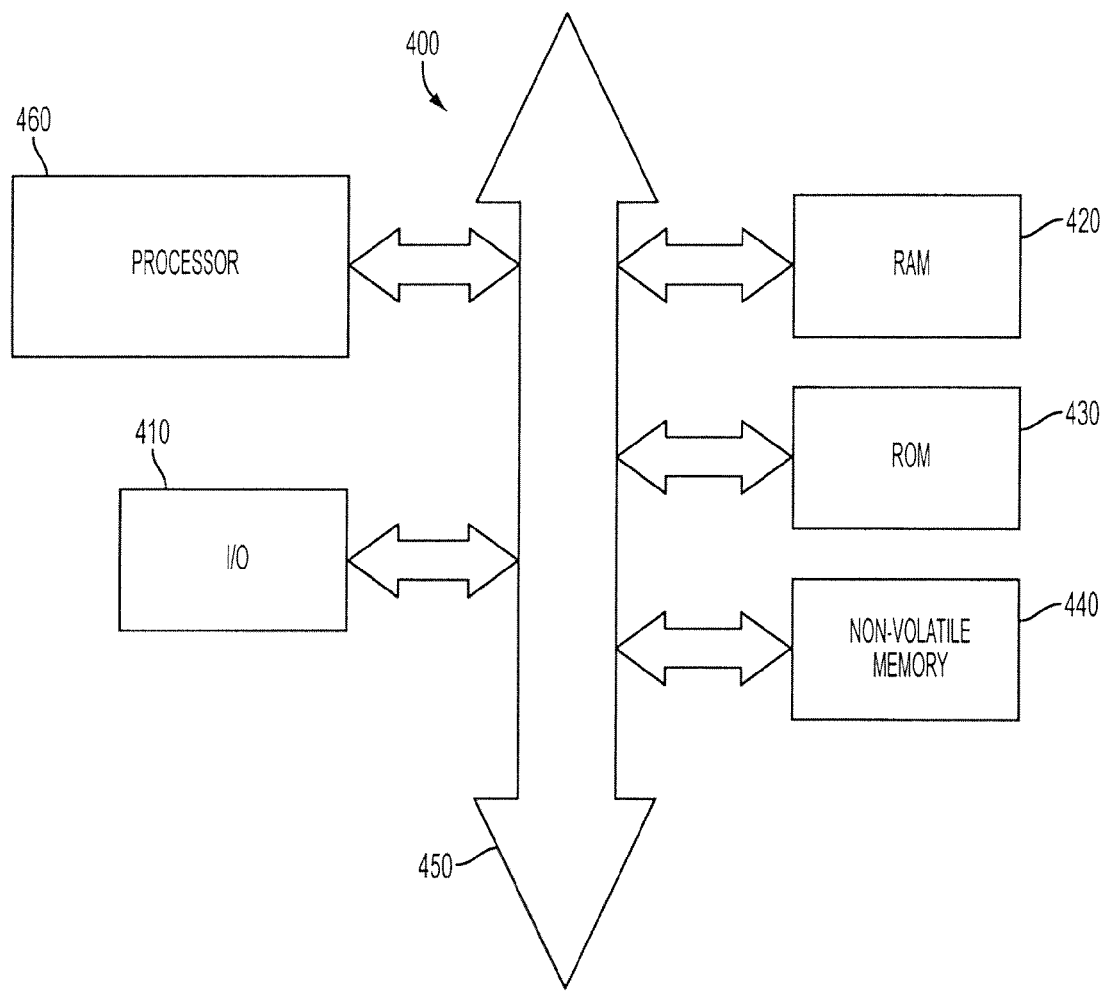
FIG. 4 illustrates a processor module in accordance with an embodiment disclosed herein.

FIG. 4 illustrates an example processor card 400, which may be used for the processor, UI and SIP proxy server modules 250, 265, 280. The card 400 includes a processor 460 for executing the processes of processor module 250 (or the other modules) that communicates with various other devices of the card 400 over a bus 450. These devices may include random access memory (RAM) 420, read-only memory (ROM) 430 and non-volatile memory 440. An input/output device (I/O) 410 provides communication into and out of the card 400. While one input/output device 410 is shown, there may be multiple I/O devices included on the card as desired. Source code, or other programming, comprising applications required by or performed by the components of the server 30 may be stored on one of the computer readable storage media on the card 400 (e.g., ROM 430, non-volatile memory 440) and executed by the processor 460.

Figure 2:
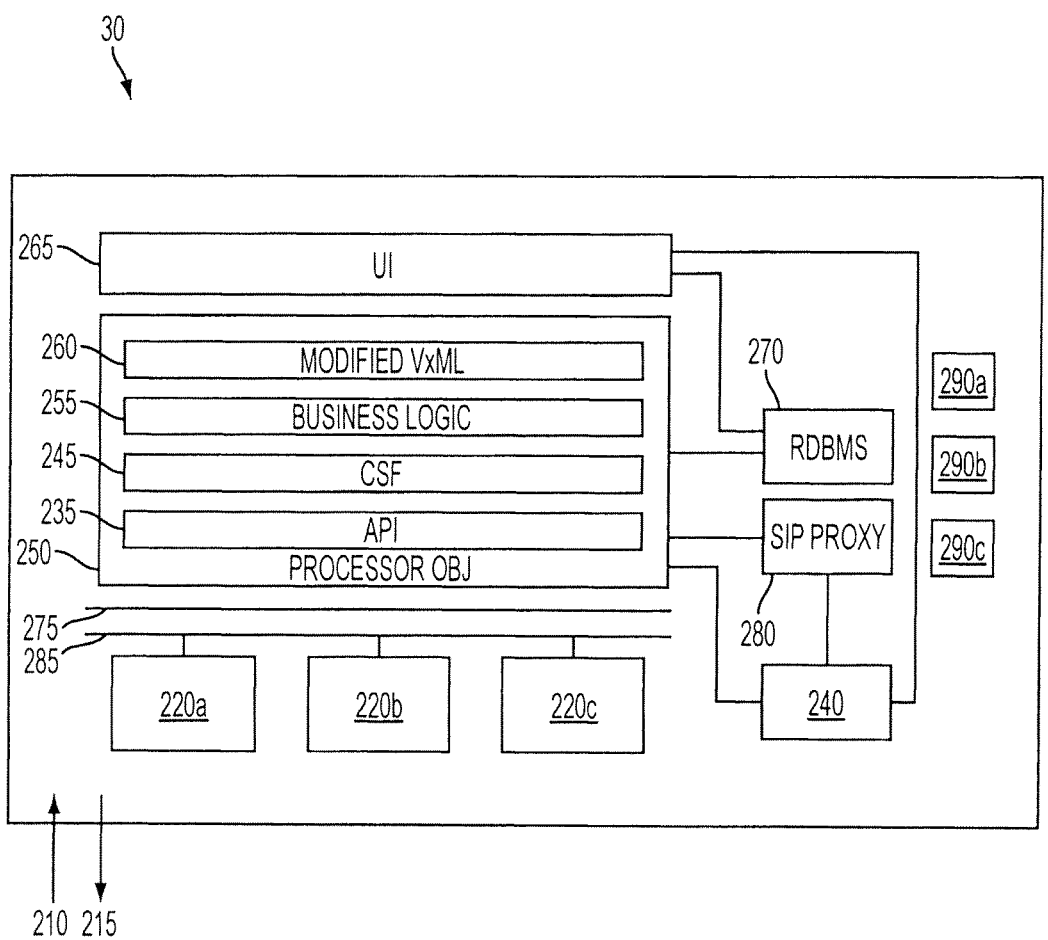
FIG. 2 illustrates a server in accordance with an embodiment disclosed herein.

Referring now to FIG. 2 and FIG. 4, the processor module 250 executes one or more computer programs or applications (Obj) stored in one or more memory units within (e.g., as shown in FIG. 4) or coupled to the processor module 250. Processor module 250 can include one or more processes such as a modified VxML 260 call flow process, business logic process 255, call service function (CSF) process 245, and a global application processing interface (API) process 235. It should be appreciated that processor module 250 can include one, all, or any combination of the processes described. The processor module 250 may also contain one or more additional databases and/or other processing memory used during the overall operation of system 10.

In one embodiment, the business logic process 255 can be used for determining whether or not a calling party (incoming or outgoing) is a participant of the server 30 network and allows the server 30 to be flexibly configured by providing routing plans and route translations, Interactive Voice Response (IVR) prompting and announcements, data manipulation, management and control. In another embodiment, the business logic 255 provides an intelligent call routing function (described below in more detail). The UI module 265 includes processes that provide an easy, but powerful, user interface to administer, configure and manage applications including the management of system, user, conference, notification, IVR and voicemail applications, to name a few.

Figure 3:
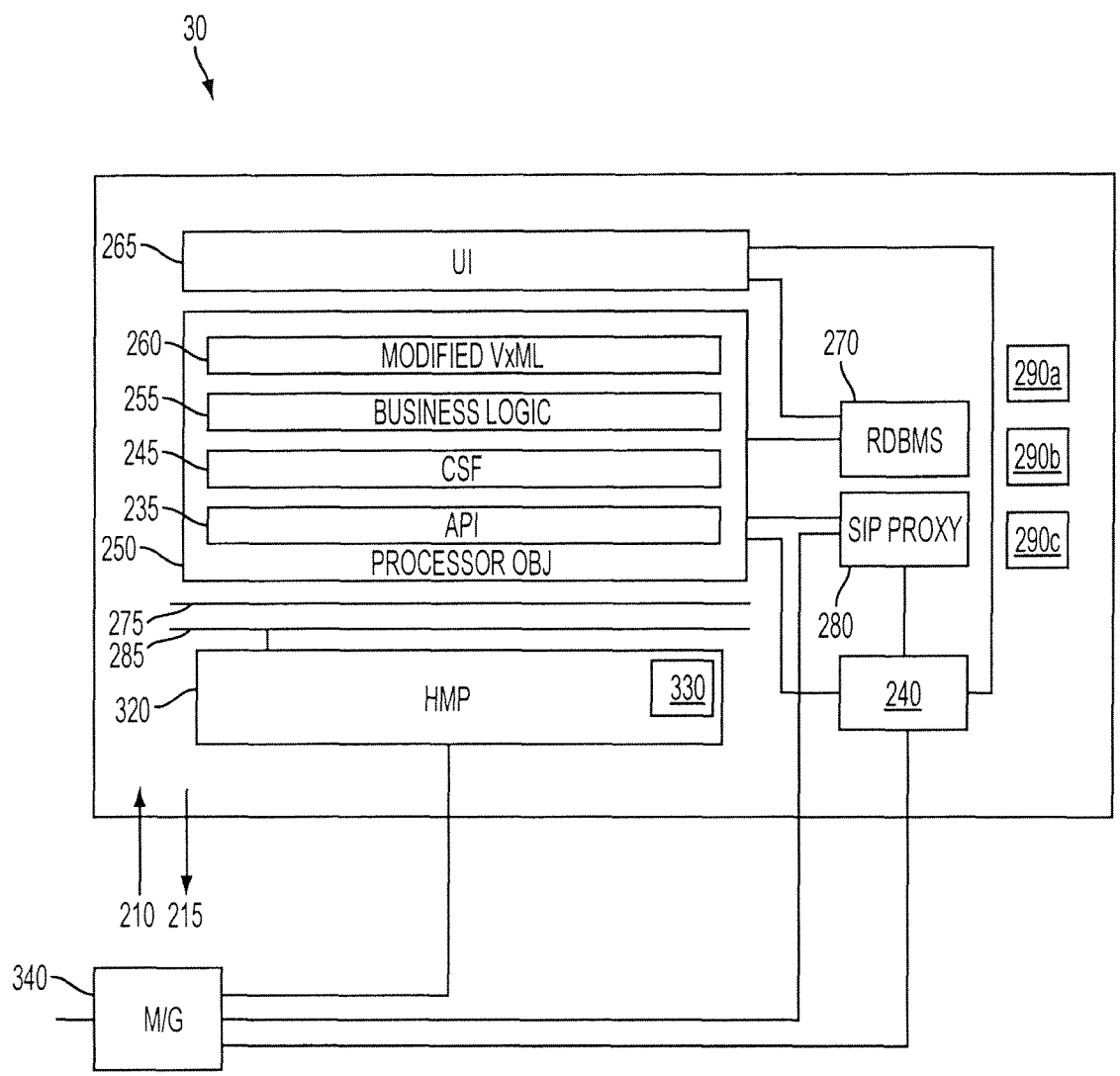
FIG. 3 illustrates a server in accordance with another embodiment disclosed herein.

The plurality of receiving and transmitting modules 220a, 220b, 220c communicate with and handle incoming and outgoing telephone calls and are connected along bus 285. In one embodiment, bus 285 is an H100 or similar bus. The receiving and transmitting modules 220a, 220b, 220c may be telephonic cards such as e.g., Intel Dialogic cards, that communicate with processor module 250, database 270 and other components via bus 275 (for example, a PCI bus), which is bridged to bus 285 (bridge not shown), and are employed to receive and transmit information to the PBX 14 and PSTN 54 during call processing. The modules 220a, 220b, 220c also receive and transmit other information such as administrative information. In another embodiment as shown in FIG. 3, the receiving and transmitting modules 220a, 220b, 220c can also be implemented as a processor module 320 such as e.g., a Host Media Processing (HMP) processor having a memory 330 comprising a program that, when executed, causes the processor 320 to perform the desired telephony functions.

In one embodiment, the workload performed by the receiving and transmitting modules 220a, 220b, 220c, as well as some of the processing functions of processor module 250, are implemented using one or more conventional processor-based programmable telephony interface circuit cards (e.g., Intel Dialogic cards) used to interface server 30 with PBX 14 and the PSTN. The cards are programmed to perform the conventional telephony services required to place and receive calls, as well as being programmed to perform the unique call processing functions described below.

The server 30 preferably contains a database of office extension numbers (also referred to herein as PBX extensions) and DID telephone numbers associated with each existing PBX extension, the DID numbers being associated with one or more devices including one or more remote devices 70. The database will be stored on a computer readable storage medium, which may be part of (e.g., database 270) or connected to the server 30. The database may also contain a server-to-PBX extension (hereinafter referred to as a "SERVER-PBX extension") and one or more remote device telephone numbers associated with each PBX extension. In the illustrated embodiment, software running on the telephony modules 220a, 220b, 220c interfaces with the database to perform the various call processing functions discussed below.

In the embodiment illustrated in FIG. 1, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the server 30 over the PRI 22 and VoIP 24 connections between the server 30 and the PBX 14. In addition, the CDP steering table of the PBX 14 directs the routing of all SERVER-PBX extensions received from the server 30 to the appropriate office telephone.

Figure 5:
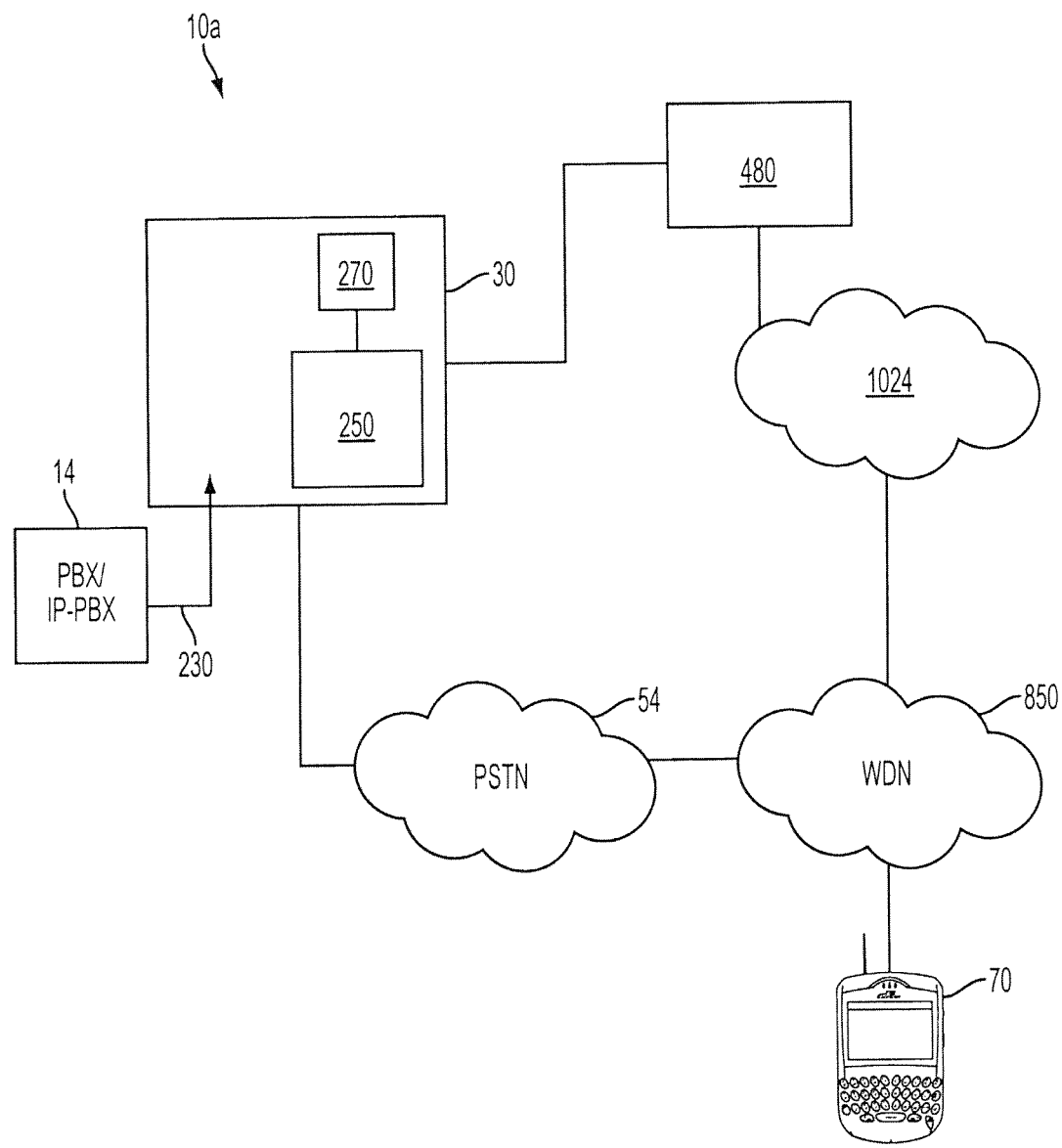
FIG. 5 illustrates another telecommunication system constructed in accordance with an embodiment disclosed herein.

FIG. 5 illustrates another example of a telecommunication system 10a constructed in accordance with another embodiment. System 10a comprises PBX 14, which is connected to server 30, including processor module 250 and database 270, via a PRI connection 230. As stated above, PBX 14 could also be an IP-PBX and thus, there can also be a VoIP connection between the server and PBX 14. There can also be a wireless connection (e.g., WiFi) if desired. Server 30 also includes components from FIG. 2 or 3 as desired, but the components are not illustrated for convenience purposes. The server 30 is connected to remote device 70 via a host system 480, network 1024 and wireless network (WDN) 850 (all of which are described in more detail below with respect to FIGS. 10 and 11). It should be appreciated that the communications between the server 30, host system 480 and remote device 70 may be encrypted to render the information in the communications (i.e., telephone numbers, user login identifications, system information and settings, etc.) indecipherable to the public. Although the use of encryption is desirable, the decision of whether encryption is to be used may be left up to the end user or system administrator of the remote device 70, host system 480 and/or server 30. The host system 480 can include a web services connection (i.e., for the Internet) to provide an interface between the server 30 and remote device 70. The host system 480 can also include a mobile data server (e.g., server 1174 of FIG. 11) for facilitating data communications between the server 30 and remote device 70. A PSTN 54 is also in communication with the server 30 and remote device 70.

The processor module 250 of the server 30 executes one or more programs stored in its associated memory to process calls received through the PBX 14 or PSTN 54. The remote device 70 will also contain a "client" application designed to communicate with the server 30 and perform the following processing in accordance with embodiments described herein. A suitable application architecture for the remote device 70 is disclosed in U.S. application Ser. No. 11/875, 212, which is hereby incorporated by reference in its entirety. A summary of the application architecture is now provided.

The remote device 70 may include a generic presentation layer, device specific presentation layer, application logic, generic device control and device specific device control. The generic presentation layer controls keypad and display functions. The device specific presentation layer controls features specific to the device 70. For example, depending on the remote device 70, the features could include interfacing with a track wheel, thumbwheel, track ball, or touch screen to name a few. The device 70 will have a screen with reasonable resolution and basic graphical capabilities. The device 70 will also have a basic user input system such as e.g., function keys, reduced or full-size keyboard, and/or a graphical input capability (e.g., touch screen). The device 70 will further include a data communications interface as described below with reference to FIGS. 8-11.

The client application utilizes standard API's and built-in capabilities of the e.g., Java ME (J2ME) environment for the management of data presentation and device control. These standard capabilities allow for a level of generic data presentation, data input control and data messaging such as e.g., TCP/IP, UDP/IP, SMS, to name a few. The application logic manages the inputs and outputs to and from the device 70 and processes this information to provide the generic device client capabilities such as e.g., administration, inbound call management, outbound call management and mid-call (or call in-progress) management.

Similar to system 10, system 10a (FIG. 5) essentially implements all or part of call management functions typically available on an office, enterprise or hotel PBX or other communications network desktop telephone. Some of these features are discussed in detail below. Moreover, the server 30 maintains control over inbound, outgoing and in-progress calls and communications. Example call processing flows are also disclosed in U.S. application Ser. No. 11/875,212, some of which are now summarized.

Initially a remote device 70 must log into server 30 by sending a session request login data signal to the server 30. This request may be performed automatically (e.g., every time the device 70 is powered-up, or periodically), it may happen manually when the user selects a predetermined device application, or it may happen automatically or manually in response to a request from the server 30. The data signal from the remote device 70 is sent through system 480 by any of the various supported methods described below (e.g., web services). In response, the server 30 will either send a data signal accepting the login request or rejecting the login request. If the device 70 is accepted, the user gains access to server 30 and the ability to process calls in any of the methods described below. The remote device 70 and server 30 can periodically or continuously request information from each other using data signals/messages. When remote device 70 sends information via a data signal/message, server 30 replies with an acknowledgement data signal. Similarly, when the server 30 sends information via a data signal to the remote device 70, it is acknowledged by the device 70 in an acknowledgement data signal. Information from the server 30 can include profile information, system settings, messages, etc. Information from the remote device 70 can include profile information, Do Not Disturb information (DND), user preferences, device configuration settings, etc.

A user can accept an incoming call placed to the user's PBX extension or DID telephone number on the remote device 70 (even though the caller did not dial the remote device's 70 telephone number). This is because inbound DID calls are received directly by the server 30 from e.g., the PSTN 54. Server 30 receives an incoming voice call for the user, holds onto that call, and sends a call setup request data signal to the remote device 70 inquiring whether or not the user would like to accept the call. The server 30 may also simultaneously ring the user's office telephone or other telephone associated with the user's PBX extension. Alternatively, the server 30 may sequentially ring the user's other telephones after a predetermined period of time elapses. The decision of whether to simultaneously or sequentially ring the user's telephony devices is based on the user's preferences stored at the server 30.

The call setup request data signal will cause an audible, visual and/or vibrational indication to occur on the remote device 70 (as set by a user or system preference). The user may answer the call by having the device 70 send an answer data signal to the server 30. In response, the server 30 will setup a voice call to the remote device 70 and substantially seamlessly connect the held calling party's incoming call to the remote device 70. The user may also deflect the inbound call to voicemail by having the device 70 send a call setup response deflect data signal to the server 30. In this scenario, the server 30 will setup a voice call to e.g., the voicemail box associated with the user's PBX extension or other voicemail box setup by the user and then connect the held calling party's incoming call to the voicemail box.

The user is also capable of placing outgoing calls from the remote device 70 through the server 30 (and thus, the PBX) in the following exemplary manner. If a user wants to place a call to party 1, the user has the remote device 70 send an out dial request data signal to server 30 requesting to place an outbound call through the server 30. Any input mechanism (e.g., keyboard, track wheel, stylus, etc.) may be used to send the out dial request from the remote device 70. Server 30 determines from the request whether the user and/or remote device 70 has sufficient rights to place the outbound call. Server 30 will respond by sending an out dial response accept data signal accepting the user's request, or by sending an out dial response reject data signal rejecting the outbound call to remote device 70 depending on the user's rights. If server 30 accepts the outbound call request, the server 30 will place an outbound voice call to the remote device 70 and another voice call to the called party (e.g., party 1). The server 30 then substantially seamlessly connects the two calls allowing voice communications between the called party and user of the remote device 70.

The system 10, 10a also provides additional call processing while a call/connection is already in progress. That is, once a voice call between a user of a remote device 70 and another party ("party A") is in progress, the server 30 allows e.g., the user to conference in another party ("party B"), place party A on hold while accepting a call from or placing a call to party B, deflect a call from party B while continuing with the party A call, to name a few. All of these scenarios are possible because the server 30 maintains control over the ongoing call. Therefore, if during a call, party B attempts to call the user, server 30 will receive the call communication from party B and send a call setup request data signal to the remote device 70 alerting the device 70 to the new call. At this point, the user can send (via the remote device 70) a data signal accepting, deflecting or conferencing in the party B call. Based on the response, the server 30 makes the necessary call connections. Likewise, if during the call with party A, the user decides to call party B, the user can send (via the remote device 70) a data signal requesting the server 30 to call party B. The server 30 initiates the call to party B, and based on the user's request, can place party A on hold, send party A to voicemail, or join the calls to form a conference call. It should be appreciated that DTMF tones can also be used instead of data signals, if desired.

It should be appreciated that the interaction between remote device 70 and server 30 can include any call processing telephony functions such as simultaneous ring across multiple devices, single voicemail box, universal voice mail notification, answer acknowledgement, making and receiving a call, abbreviating extension dialing, call hold and retrieval, multiple call appearance, direct inward/outward dialing, post digit dialing, flexible dialing plans/international dialing, caller ID (name, number), voicemail notification, auto reconnect, callback, call forwarding, call transfer, call hold, call waiting, call mute, call blocking, call redial, call parking, speed dial, operator assisted dialing, Do Not Disturb (DND) i.e., forward calls to voicemail instead of the user), DND Bypass List (i.e., a list of names/numbers allowed to bypass the do not disturb feature), and DND Ignore List (i.e., a list of names/numbers to always divert to voicemail).

In accordance with an embodiment, the database of server 30 may also contain numerous system-defined user access rights and user modifiable preferences, which can alter the call processing described herein. Referring back to FIG. 1, an office administrator may use the network computers 42a, 42b or a remote administration device 52 to set user access rights and priorities. The user may use the remote administration device 52 or any device to set numerous user preferences. It is desirable that a Web-based or graphical user interface be used so that the user can easily access and set user preferences. The network computers 42a, 42b (or remote device 52) may also be used by the user if so desired.

Figure 6A:
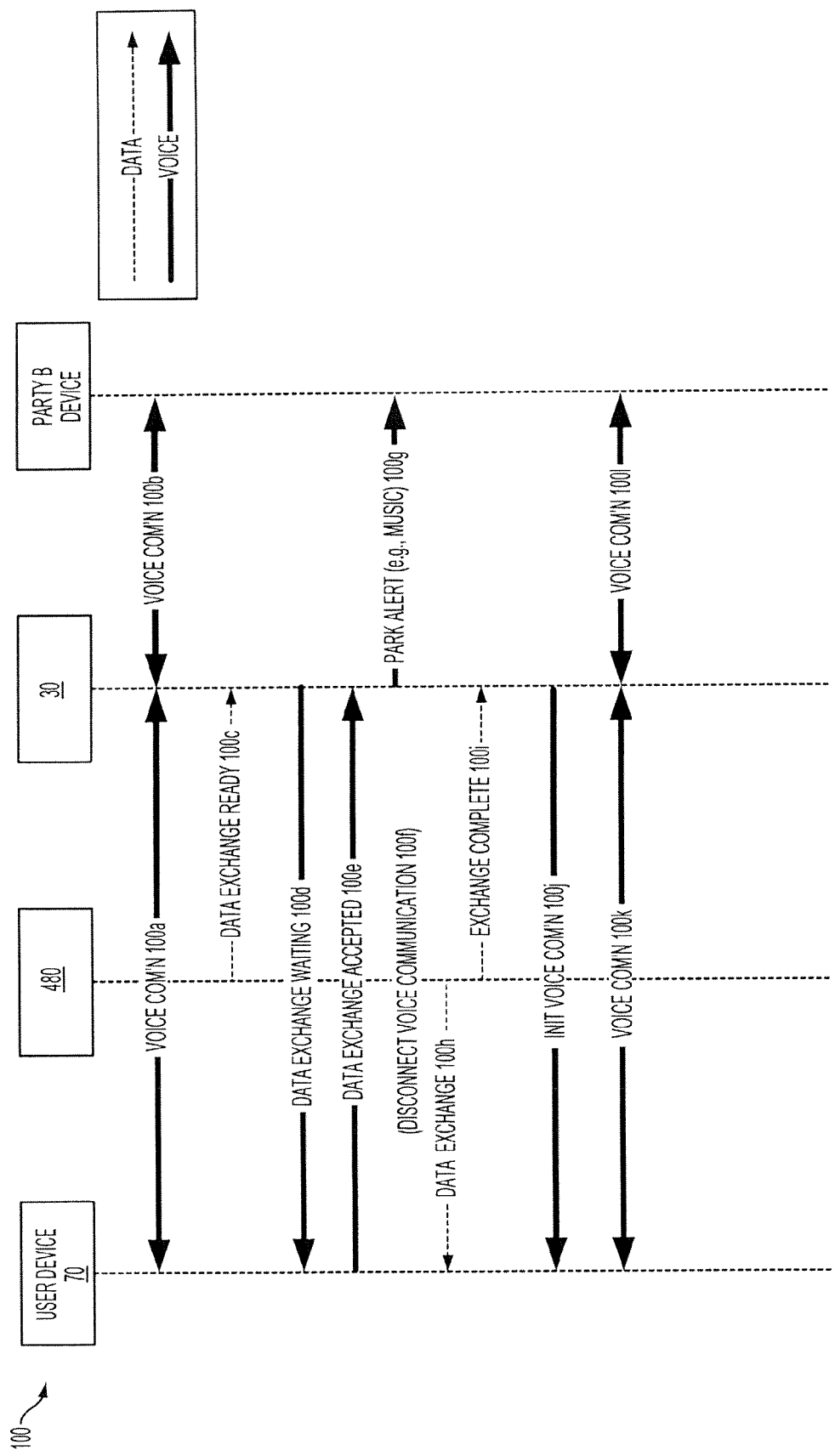
FIGS. 6A-6C are flow line diagrams illustrating voice communication and data exchange processing in accordance with embodiments disclosed herein.

FIG. 6A illustrates a first scenario 100 in which a data exchange is initiated while a user is engaged in a voice communication using a non-class A mobile/remote device in accordance with an embodiment disclosed herein. In this scenario 100, the user is communicating using remote device 70, while a "party B" is communicating with any conventional wireless or landline telephone/device. It should be appreciated that the remote device 70 disclosed herein (and further described in relation to FIGS. 8-9) may be a class A device and the present disclosure is not intended to limit the device 70 to a non-class A device, but for purposes of the following examples, the remote device is a non-class A device, such as a class B device. The voice communication is split into two legs. A first voice communication path between the remote device 70 and the server 30 (flow line 100A) and a second voice communication path between the server 30 and party B (flow line 100B). This type of voice communication and the manner in which it is initiated was described above.

In the illustrated example, at some point during the voice communication, the host system 480 (or a component within the system 480) determines that a data transaction (e.g., e-mail, data download, etc.) for the user associated with the remote device 70 is pending. In one embodiment, the host system 480 sends a data message to the server 30 indicating that a data exchange for the user is ready (flow line 100C). In another embodiment, the host system 480 first determines if there is an IT or other enterprise policy regarding whether an exchange can be initiated during a voice communication before alerting the server 30. For example, the relevant policy could prohibit all exchanges regardless of their priority, in which case the scenario 100 would continue solely with the established voice communication between the user and party B. On the other hand, the policy could prohibit only exchanges with normal to low priority, while allowing high priority exchanges to occur. It is also possible for the policy to allow exchanges for certain users and/or from certain users. As can be appreciated, any policy regarding the data exchanges would be application, enterprise and/or user specific. The illustrated example presumes that the data exchange is allowable.

After the server 30 receives the data exchange ready data message (flow line 100C), the server 30 sends a data exchange waiting indication signal/message to the user's remote device (flow line 100D). This indication can be e.g., a voice signal, a DTMF tone or a Short Message Service (SMS) message having an appropriate code for the intended indication. For purposes of the example illustrated in FIG. 6A only, the data exchange waiting indication is illustrated as a voice signal in flow line 100D.

The data exchange waiting indication will cause an audible, visual and/or vibrational notification to occur on the remote device 70 (as set by a user or system preference). This notification will not be noticed by party B. For example, in one embodiment or as determined by a user/system preference, the notification is a message whispered to the user of the remote device 70. A whispered message is a message that party B cannot hear. The message will indicate that "incoming data is available" and will provide the user of the device 70 instructions on how to accept or ignore the incoming data.

Figure 7A:
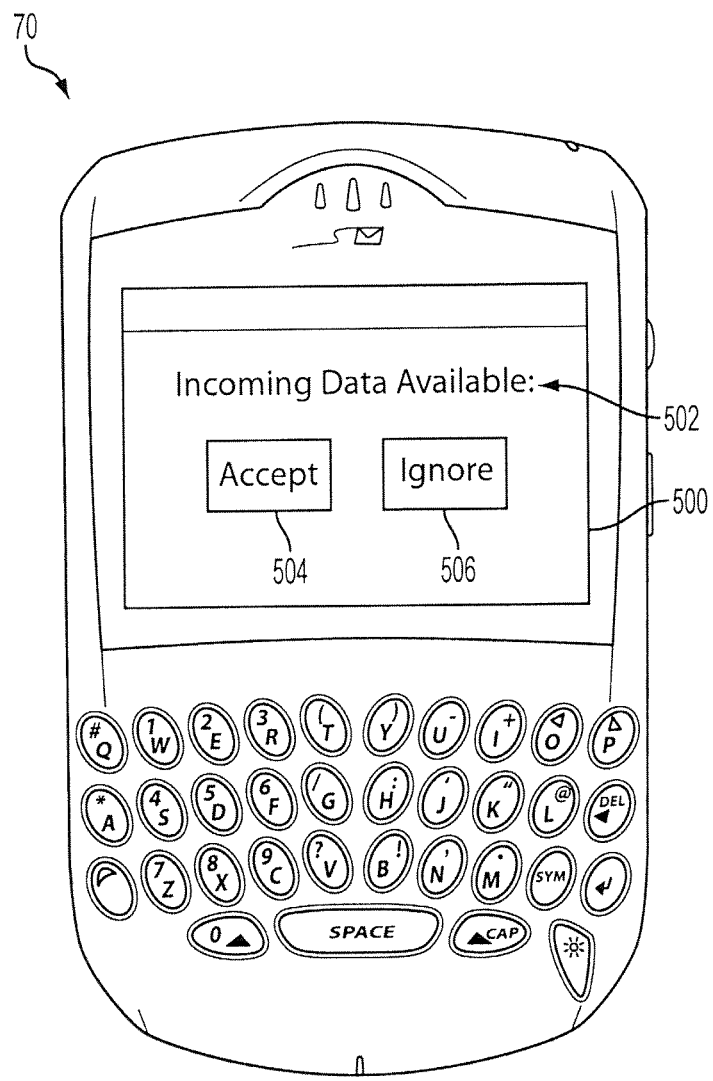
FIG. 7A-7C illustrate example user interfaces of a mobile device in accordance with embodiments disclosed herein.

Another option provides for a visual indication such as the pop-up window 500 illustrated in FIG. 7A. As can be seen in FIG. 7A, the window 500 includes a message 502 containing the text "Incoming Data Available" and two software buttons 504, 506. The first button 504 allows the user to "Accept" the incoming data by pressing the button 504 by any available method supported by the device 70 (e.g., via the keypad, track ball, roller wheel, touch screen, etc.). The second button 506 allows the user to "Ignore" the incoming data by pressing the button 506. Another visual indication could simply be the flashing of a symbol on the remote device 70. In addition or alternatively, an audible tone and/or a vibrational indication may be used to alert the user of the incoming data request. In a preferred embodiment, the audible or vibrational notifications are used with a visual indication that provides the user with instructions or the means (e.g., buttons 504, 506) to accept or ignore the incoming data. Otherwise, valid responses to the notification must be previously communicated to and generally available for the user (e.g., user manual, enterprise frequently asked questions (FAQ) menu, etc.).

Regardless of how the notification is provided to the user of the remote device 70, and regardless of how the user decides to accept the data exchange, a data exchange accepted indication is transmitted to the server 30 (flow line 100E). The indication may be a voice signal, DTMF audible tone or an SMS message having an appropriate code. For example purposes only, the data exchange accepted indication is shown as a voice signal in FIG. 6A. It should be appreciated that a data exchange ignore or rejected indication could also be transmitted to the server 30 at flow line 100E if the user decides to reject the data exchange—in which case the scenario 100 would continue solely with the established voice communication between the user and party B. The illustrated example presumes that the data exchange was accepted.

Once the server 30 determines that the data exchange has been accepted (i.e., receipt of the data exchange accepted indication), the server 30 disconnects/drops the voice communication leg between the server 30 and the remote device (flow line 100F). Immediately thereafter, before or simultaneously, the server 30 parks the voice communication to party B and sends a park alert indication to party B's device (flow line 100G). The park alert indication can be a voice recorded message stating that party B has been temporarily placed on hold, the indication can be music, some other audible notification (e.g., news, weather, sports scores, etc.), or a combination thereof.

Once party B has been parked and the voice communication to the remote device 70 terminated, the host system 480 knows that the remote device 70 is available to receive data and begins the data exchange (flow line 100H). Alternatively, the server 30 could send an indication to the host system 480 (not shown) when the remote device 70 is available for the data exchange (i.e., shortly after the voice communication leg is disconnected). When the data exchange is complete, the host system 480 sends the server 30 a data message indicating that the exchange is complete (flow line 100I). The server 30 responds by initiating a new voice communication leg with the remote device 70 (flow line 100J). Once a voice communication leg is established between the server 30 and the remote device 70 (flow line 100K), the server 30 unparks party B and connects the voice communication leg to party B (flow line 100L) with the leg to the remote device 70. Thus, within a matter of seconds, a data exchange can be initiated and completed even though the user of the remote device 70 was engaged in a cellular voice communication using a non-class A device.

Figure 6B:
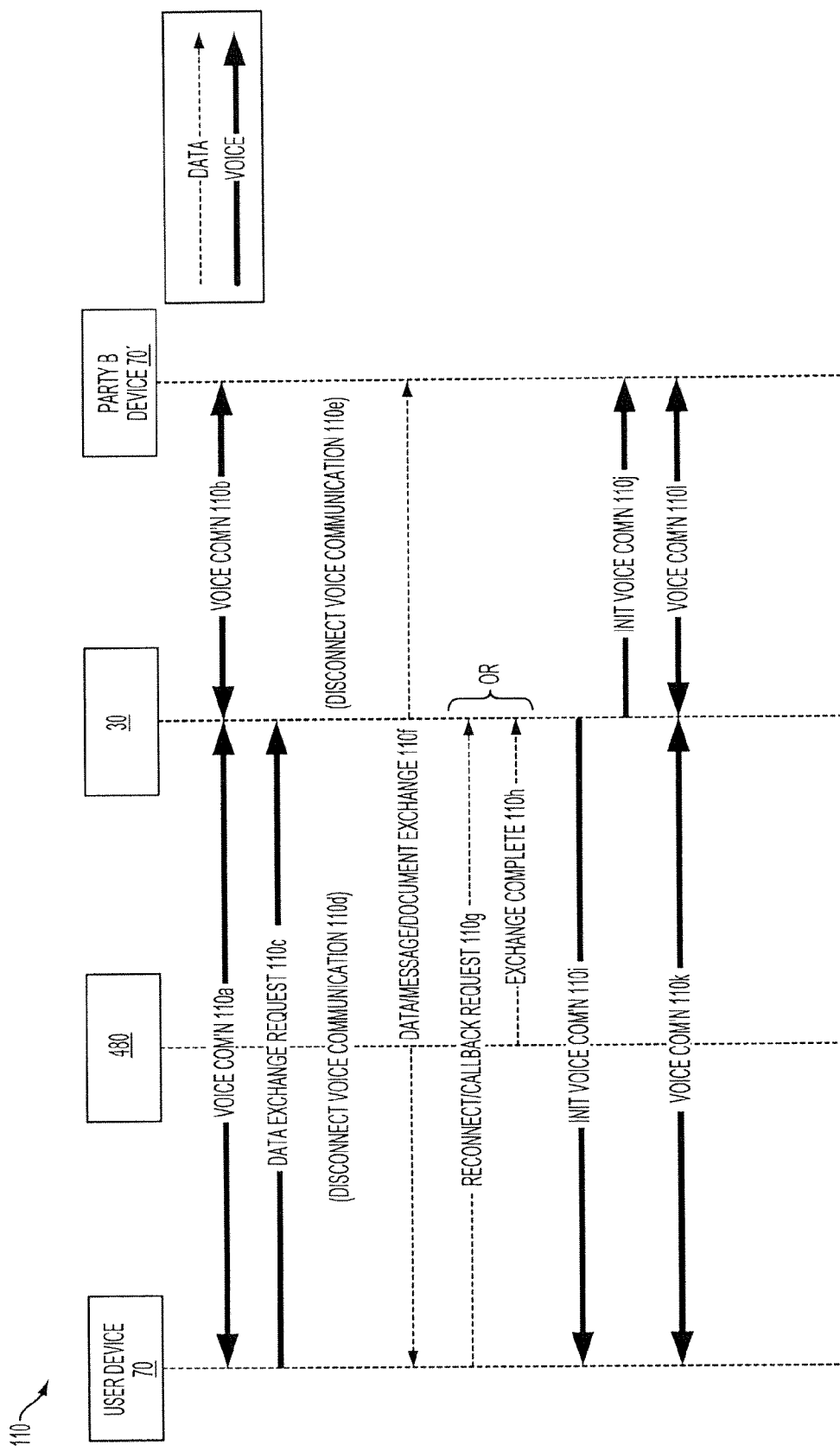

FIG. 6B illustrates a second scenario 110 in which a data exchange is initiated while a user is engaged in a voice communication using a non-class A mobile/remote device in accordance with another embodiment disclosed herein. In this scenario 110, the user is communicating using remote device 70, while party B is communicating with another remote device 70' that is also registered with the server 30 (as opposed to the conventional wireless or landline telephone/device used in scenario 100). The voice communication is split into two legs. A first voice communication path between remote device 70 and the server 30 (flow line 110A) and a second voice communication path between the server 30 and party B's remote device 70' (flow line 110B).

Figure 7B:
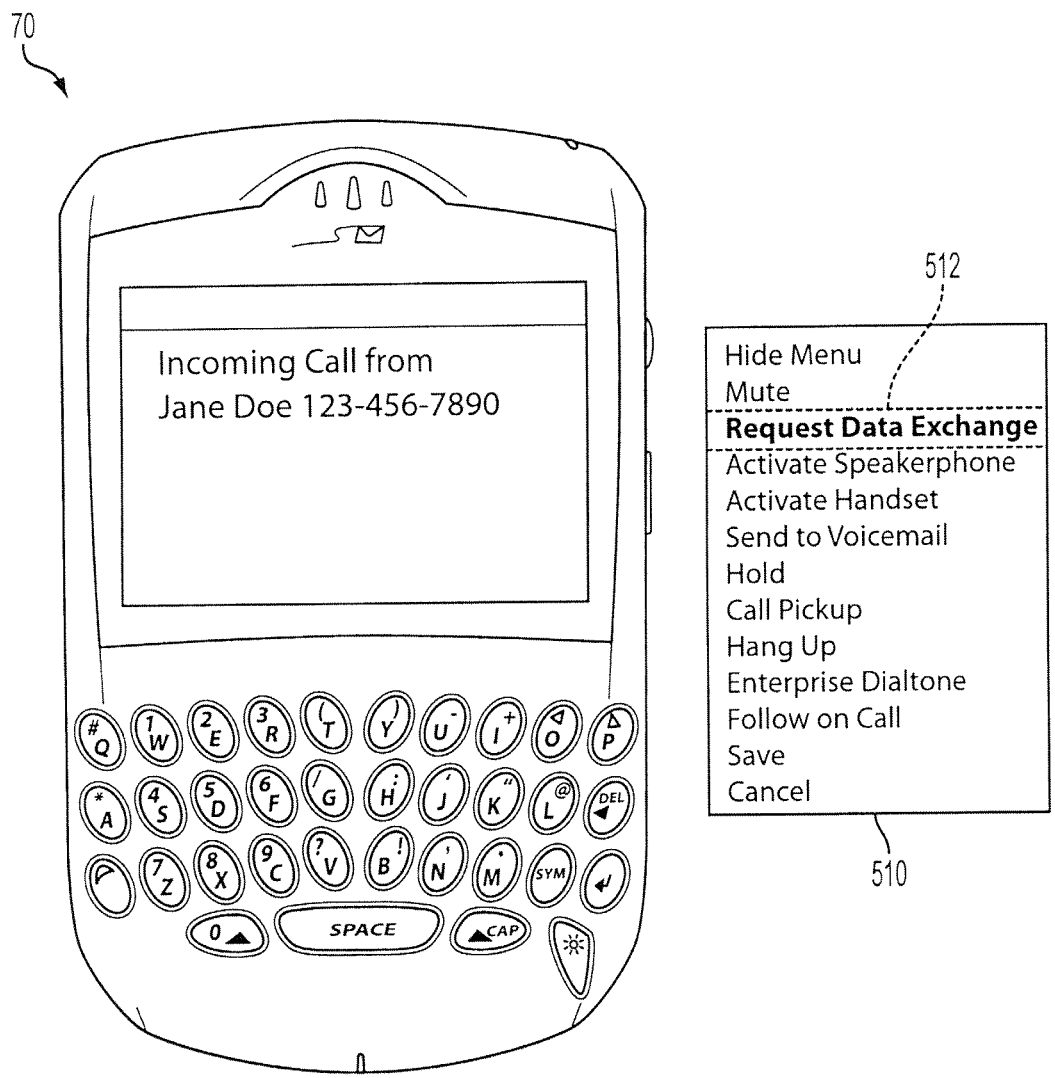

In the illustrated example, at some point during the voice communication, the user of remote device 70 decides that a data exchange (e.g., e-mail, data download, etc.) with party B is needed. The user of remote device 70 will send an indication to the server 30 that a data exchange is requested (flow line 110C). In one embodiment, the user of remote device 70 sends the signal by accessing a menu on the device 70, such as the menu 510 illustrated in FIG. 7B. As shown in FIG. 7B, the menu 510 contains a selectable field 512 containing the text "Request Data Exchange". The field 512 may be selected using any available method supported by the device 70 (e.g., via the keypad, track ball, roller wheel, touch screen, etc.). When the Request Data Exchange field 512 is selected, the remote device 70 generates and sends the data exchange request indication to the server 30 (flow line 110C). In another embodiment, the user can send a SMS message (e.g., text message) to the server 30 with an appropriate keyword or code for requesting a data exchange. In yet another embodiment, the user of the remote device 70 can request the data exchange by pressing one or a series of keys on the keypad in accordance with a predefined manner associated with requesting a data exchange. Like other non-graphical procedures, the instructions for initiating the data exchange should be previously communicated to and generally available for the user (e.g., user manual, enterprise frequently asked questions (FAQ) menu, etc.).

Regardless of how the user manipulates the remote device 70, the device 70 will send an indication to the server 30 requesting the data exchange. This indication can be e.g., a voice signal, a DTMF tone or an SMS message. For purposes of the example illustrated in FIG. 6B only, the data exchange request indication is illustrated as a voice signal in flow line 110C. At this point, it may be preferable for the server 30 to determine if the user has rights to initiate a data exchange while on a voice call or if party B wishes to accept the exchange (as described above with reference to FIG. 6A). For purposes of the illustrated example, it is presumed that the exchange may occur. Moreover, the server 30 may alert party B, by any method, that the voice communication will be briefly terminated to allow for the data exchange. The server 30 disconnects/drops the voice communication leg between the server 30 and remote device 70 (flow line 110D) while also disconnecting/dropping the voice communication leg between the server 30 and party B's remote device 70' (flow line 110E). Since both parties are using a remote device 70, 70' registered with the server 30, there is no need to place party B on hold.

Figure 7C:
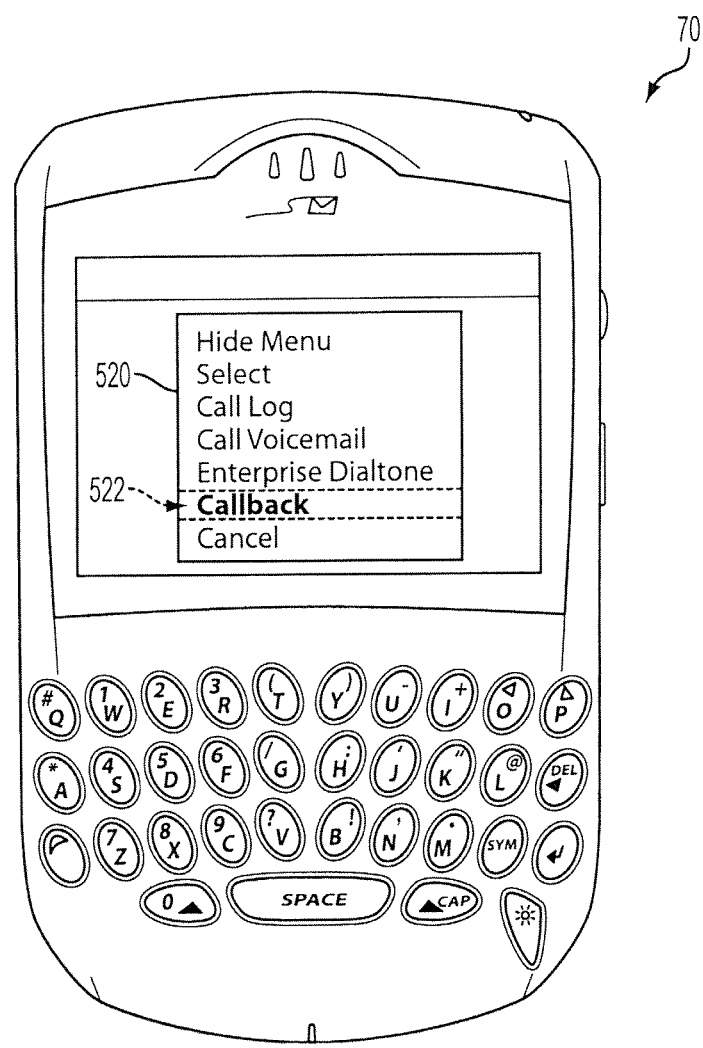

Once the voice communications are terminated, the user of remote device 70 may begin the data exchange with party B (via the host system 480 as described below with reference to FIGS. 8-11) (flow line 110F). When the data exchange is complete, the user of remote device 70 can send an indication to server 30 requesting to be reconnected with party B (i.e., callback party B) (flow line 110G). The indication can be initiated using a menu on the remote device 70 such as the menu 520 illustrated in FIG. 7C. The menu 520 contains a selectable field 522 containing the text "Callback". The field 522 may be selected using any available method supported by the device 70 (e.g., via the keypad, track ball, roller wheel, touch screen, etc.). When the Callback field 522 is selected, the remote device 70 generates and sends the reconnect/callback indication to the server 30 (flow line 110G). Because data exchanges are allowed at this point, the reconnect/callback indication can be a data message (as shown in FIG. 6B). The indication may also be an audible DTMF tone, voice signal or SMS message if desired.

In another embodiment, if the host system 480 determines that a predetermined period of time has elapsed since the data exchange completed, the system may send the server 30 a data message indicating that the exchange has completed (flow line 110H). Moreover, the server 30 may track the time since the data exchange was accepted and determine on its own (after a predetermined period of time) that the exchange is complete. Regardless of how the server 30 is alerted that the exchange is complete, once alerted, the server 30 will initiate a new voice communication with remote device 70 (flow line 110I) and sequentially or simultaneously initiate a new voice communication with party B's remote device 70' (flow line 110j). Once a voice communication leg is established between the server 30 and remote device 70 (flow line 110K) and a second leg is established between the server 30 and remote device 70' (flow line 110L), the server 30 connects the two legs so the user and party B may continue their voice communication. The FIG. 6B example illustrates a data exchange between the two remote devices 70, 70' registered with the server 30. It should be appreciated, however, that the actual data exchange (flow line 110F) could have been between remote device 70 and another device, with a reconnection to party B's remote device 70' after the exchange (as shown with flow lines 110I-110L). That is, the embodiment is not to be limited by the intended recipient of the data exchange.

Figure 6C:
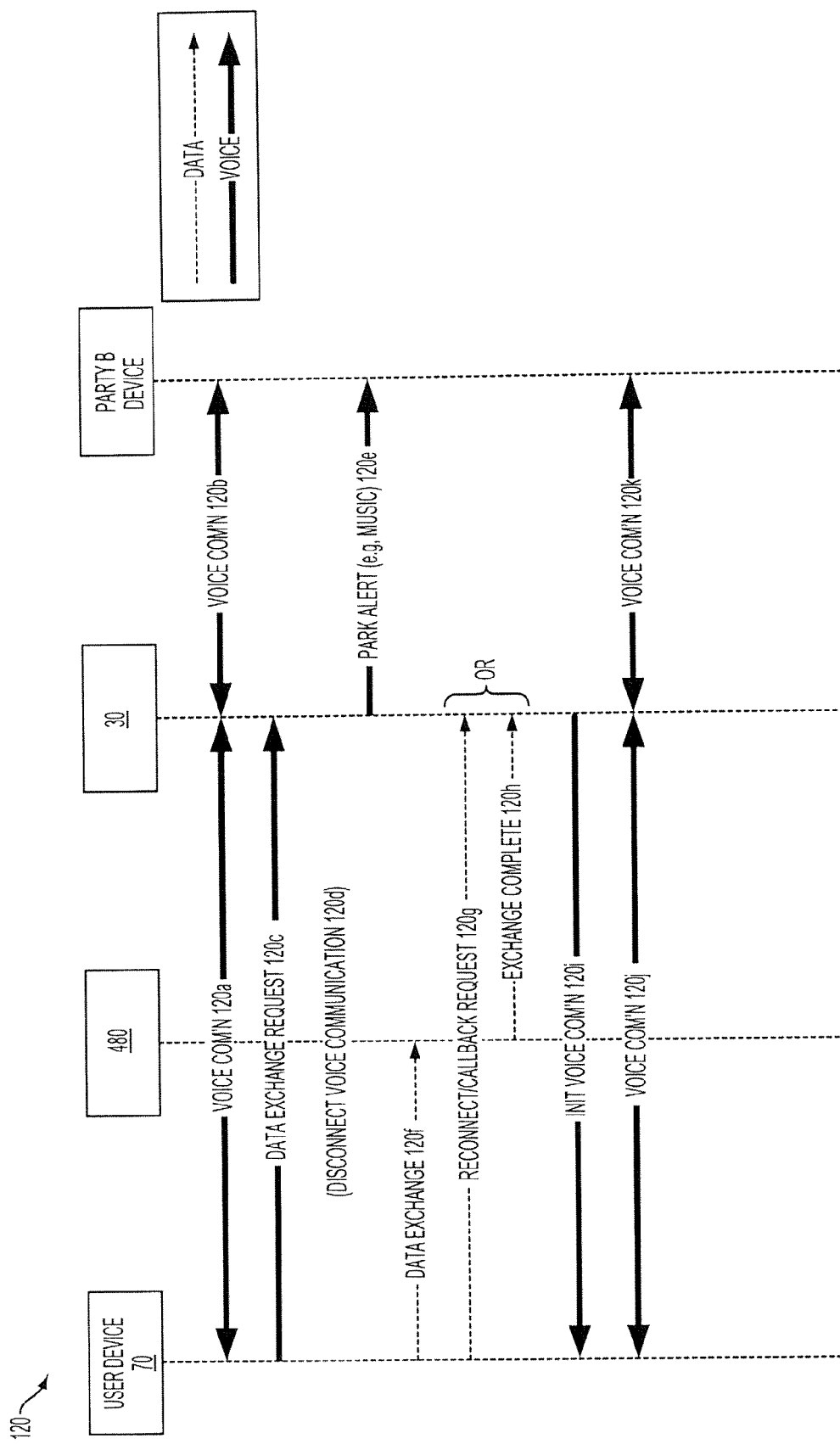

FIG. 6C illustrates another scenario 120 in which a data exchange is initiated while a user is engaged in a voice communication using a non-class A mobile/remote device in accordance with another embodiment disclosed herein. In this scenario 120, the user is communicating using remote device 70, while party B is communicating with any conventional wireless or landline telephone/device. The voice communication is split into two legs. A first voice communication path between remote device 70 and the server 30 (flow line 120A) and a second voice communication path between the server 30 and party B's device (flow line 120B).

In the illustrated example, at some point during the voice communication, the user of remote device 70 decides that a data exchange (e.g., e-mail, data download, etc.) is needed. The data exchange does not need to be with party B. As described above with respect to FIGS. 6B and 7B, the user of the remote device 70 will send an indication to the server 30 that a data exchange is requested (flow line 120C). Regardless of how the user manipulates the remote device 70, the remote device 70 will send an indication to the server 30 requesting the data exchange (as described above). The server 30 disconnects/drops the voice communication between the server 30 and remote device 70 (flow line 120D) while parking the voice communication between the server 30 and party B as described above with respect to FIG. 6A (flow line 120E).

Once the voice communication between the remote device 70 and the server is terminated and once the communication with party B has been parked, the user of remote device 70 may begin the data exchange. FIG. 6C illustrates a data flow from remote device 70 to the host system 480 (flow line 120F). The host system 480 determines the destination for the data and sends the data in the appropriate manner (as described below with reference to FIGS. 8-11). When the data exchange is complete, the user of remote device 70 can send an indication to server 30 requesting to be reconnected with party B (i.e., callback party B) (flow line 120G) in one of the manners described above with reference to FIG. 6B and FIG. 7C. Similar to the prior embodiments, if the host system 480 determines that a predetermined period of time has elapsed since the data exchange completed, it may send the server 30 a data message indicating that the exchange has completed (flow line 120H).

Regardless of how the server 30 is alerted that the exchange is complete, once alerted, the server 30 will initiate a new voice communication with remote device 70 (flow line 120I). Once a voice communication leg is established between the server 30 and the remote device 70 (flow line 120J), the server 30 unparks the party B leg and connects the voice communication leg to party B (flow line 120K) with the leg to the remote device 70. Accordingly, the illustrated embodiment provides a mechanism for initiating a data exchange (e.g., e-mail, document download, video, etc.) from a non-class A cellular device (e.g., remote device 70) during an existing voice communication without the need to initially disconnect the parties, which would have been required by today's devices. Thus, the embodiments described herein provide several advantages over today's non-class A communication devices.

It should be appreciated that the system could utilize "voice over IP" communications (i.e., voice over a data network) with appropriate remote devices. Many of today's wireless telephones and PDA's have the ability to place and receive cellular and data (voice over IP) telephone calls and to access the Internet or other data network. It should be appreciated that any conventional remote device could be used with system.

Figure 8:
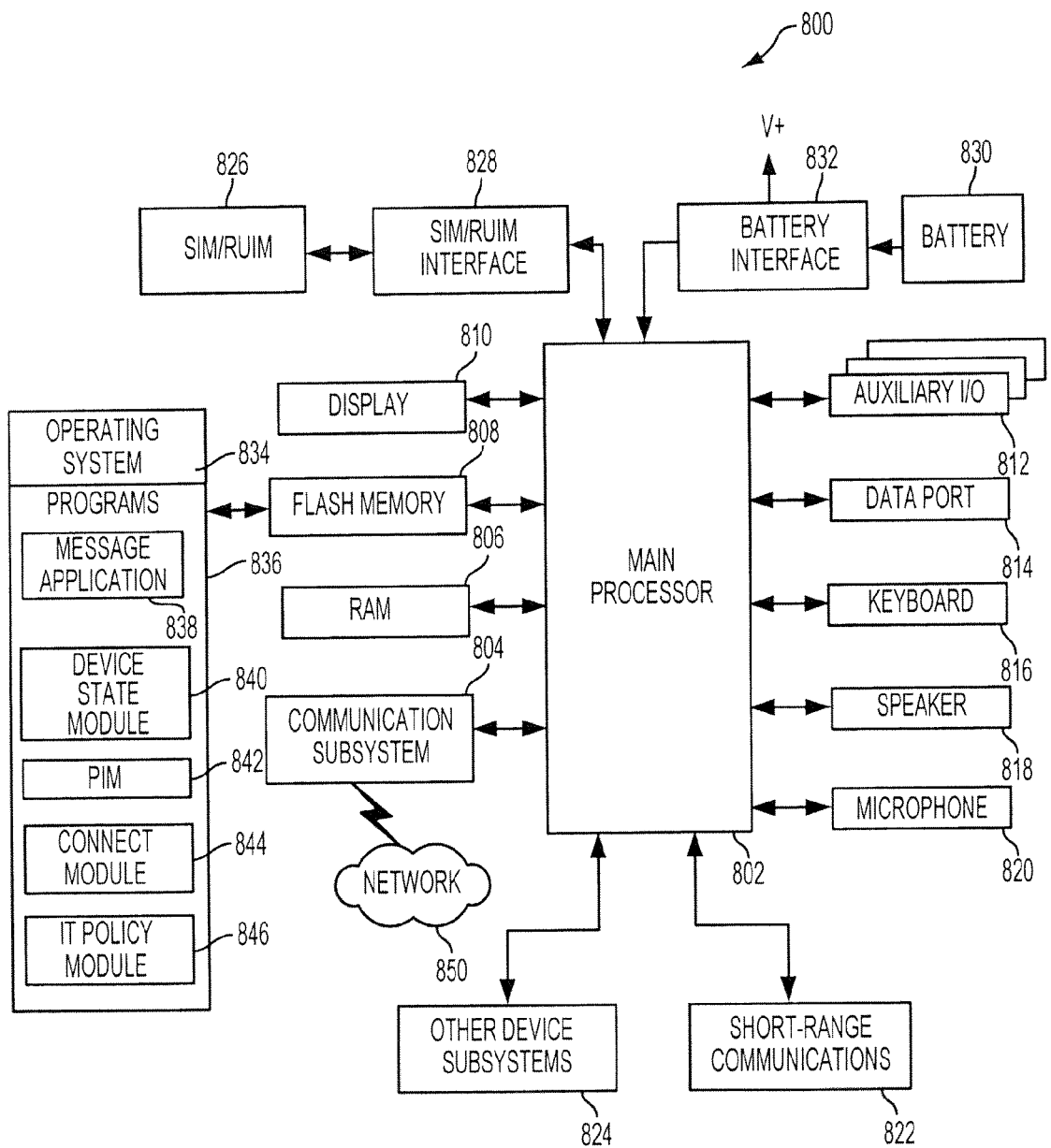
FIG. 8 is a block diagram of an example mobile device constructed in accordance with an embodiment disclosed herein.

In one embodiment, remote device 70 can be implemented as mobile device 800, illustrated in FIG. 8. Mobile device 800 is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device 800 and how it communicates with other devices and host systems, reference will now be made to FIGS. 8 through 11.

Referring to FIG. 8, shown therein is a block diagram of an exemplary embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 receives messages from and sends messages to a wireless network 850. In this exemplary embodiment of the mobile device 800, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with mobile device 800 is a GSM/GPRS wireless network in one exemplary implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications 822 and other device subsystems 824.

Some of the subsystems of the mobile device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 is not fully operational for communication with the wireless network 850. By inserting the SIM card/RUIM 826 into the SIM/RUIM interface 828, a subscriber can access all subscribed services. Services may include: web browsing and messaging such as e-mail, voicemail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 800. Although current technology makes use of a battery, future technologies such as micro fuel cells may provide the power to the mobile device 800.

The mobile device 800 also includes an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the mobile device 800 with respect to such items. This can be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with. Examples of a wireless infrastructure and an enterprise system are given in FIGS. 10 and 11, which are described in more detail below.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy module 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 830 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 is substantially similar, except that the received signals are output to the speaker 818, and signals for transmission are generated by the microphone 820. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 9:
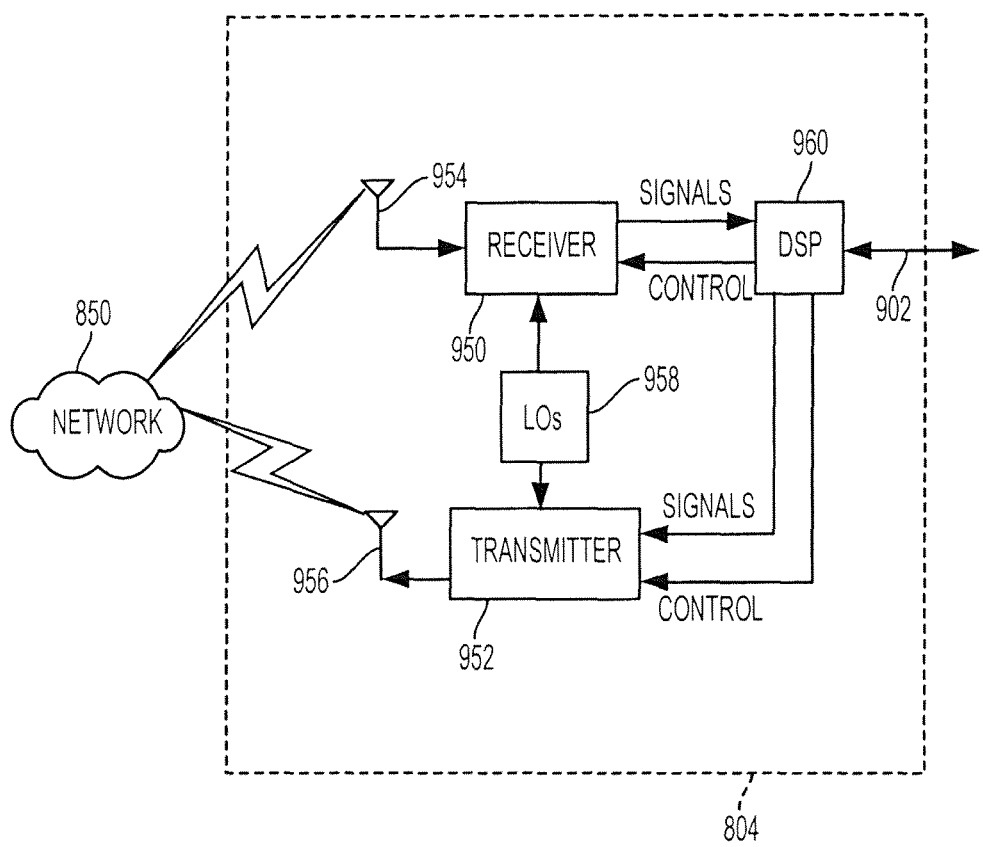
FIG. 9 is a block diagram of an example communication subsystem component of the mobile device in accordance with an embodiment disclosed herein.

Referring to FIG. 9, an exemplary block diagram of the communication subsystem component 804 is shown. The communication subsystem 804 includes a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 is dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via the antenna 956. The DSP 960 not only processes communication signals, but also provides for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

Figure 10:
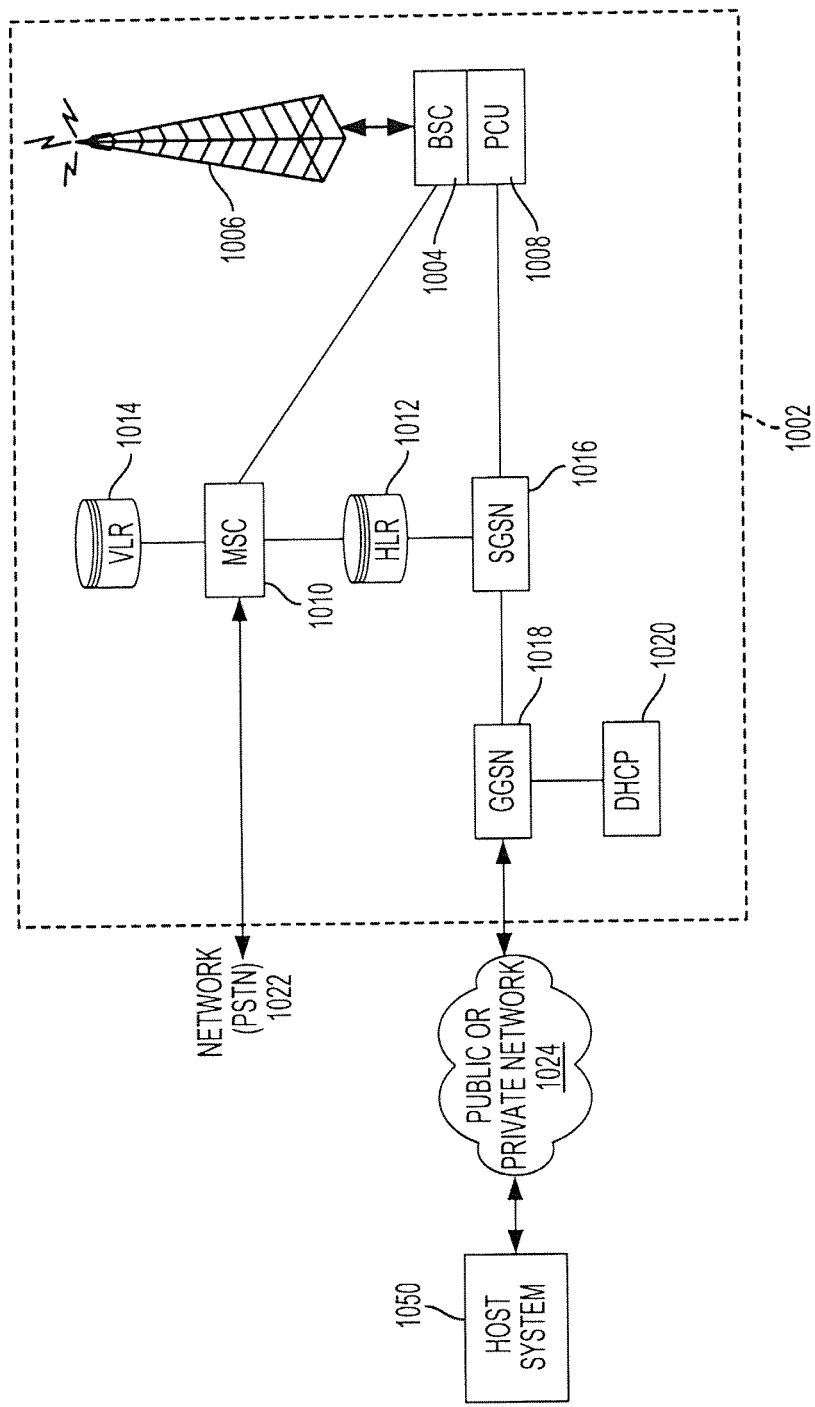
FIG. 10 is a block diagram of an example node of a wireless network in accordance with an embodiment disclosed herein.

Referring to FIG. 10, a block diagram of an exemplary implementation of a node 1002 of the wireless network 850 is shown. In practice, the wireless network 850 comprises one or more nodes 1002. In conjunction with the connect module 844, the mobile device 800 can communicate with the node 1002 within the wireless network 850. In the exemplary implementation of FIG. 10, the node 1002 is configured in accordance with General Packet Radio Service (GPRS) and Global Systems for Mobile (GSM) technologies. The node 1002 includes a base station controller (BSC) 1004 with an associated tower station 1006, a Packet Control Unit (PCU) 1008 added for GPRS support in GSM, a Mobile Switching Center (MSC) 1010, a Home Location Register (HLR) 1012, a Visitor Location Registry (VLR) 1014, a Serving GPRS Support Node (SGSN) 1016, a Gateway GPRS Support Node (GGSN) 1018, and a Dynamic Host Configuration Protocol (DHCP) 1020. This list of components is not meant to be an exhaustive list of the components of every node 1002 within a GSM/GPRS network, but rather a list of components that are commonly used in communications through the network 850.

In a GSM network, the MSC 1010 is coupled to the BSC 1004 and to a landline network, such as a Public Switched Telephone Network (PSTN) 1022 to satisfy circuit switched requirements. The connection through the PCU 1008, the SGSN 1016 and the GGSN 1018 to a public or private network (Internet) 1024 (also referred to herein generally as a shared network infrastructure) represents the data path for GPRS capable mobile devices. In a GSM network extended with GPRS capabilities, the BSC 1004 also contains the Packet Control Unit (PCU) 1008 that connects to the SGSN 1016 to control segmentation, radio channel allocation and to satisfy packet switched requirements. To track the location of the mobile device 800 and availability for both circuit switched and packet switched management, the HLR 1012 is shared between the MSC 1010 and the SGSN 1016. Access to the VLR 1014 is controlled by the MSC 1010.

The station 1006 is a fixed transceiver station and together with the BSC 1004 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 1006. The fixed transceiver equipment normally performs such functions as modulation and possibly encoding and/or encryption of signals to be transmitted to the mobile device 800 in accordance with particular, usually predetermined, communication protocols and parameters, under control of its controller. The fixed transceiver equipment similarly demodulates and possibly decodes and decrypts, if necessary, any communication signals received from the mobile device 800 within its cell. Communication protocols and parameters may vary between different nodes. For example, one node may employ a different modulation scheme and operate at different frequencies than other nodes.

For all mobile devices 800 registered with a specific network, permanent configuration data such as a user profile is stored in the HLR 1012. The HLR 1012 also contains location information for each registered mobile device and can be queried to determine the current location of a mobile device. The MSC 1010 is responsible for a group of location areas and stores the data of the mobile devices currently in its area of responsibility in the VLR 1014. Further, the VLR 1014 also contains information on mobile devices that are visiting other networks. The information in the VLR 1014 includes part of the permanent mobile device data transmitted from the HLR 1012 to the VLR 1014 for faster access. By moving additional information from a remote HLR 1012 node to the VLR 1014, the amount of traffic between these nodes can be reduced so that voice and data services can be provided with faster response times and at the same time requiring less use of computing resources.

The SGSN 1016 and the GGSN 1018 are elements added for GPRS support; namely packet switched data support, within GSM. The SGSN 1016 and the MSC 1010 have similar responsibilities within the wireless network 850 by keeping track of the location of each mobile device 800. The SGSN 1016 also performs security functions and access control for data traffic on the wireless network 800. The GGSN 1018 provides internetworking connections with external packet switched networks and connects to one or more SGSN's 1016 via an Internet Protocol (IP) backbone network operated within the network 850. During normal operations, a given mobile device 800 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 1020 connected to the GGSN 1018. There are many mechanisms for dynamic IP assignment, including using a combination of a Remote Authentication Dial-In User Service (RADIUS) server and a DHCP server. Once the GPRS Attach is complete, a logical connection is established from a mobile device 800, through the PCU 1008, and the SGSN 1016 to an Access Point Node (APN) within the GGSN 1018. The APN represents a logical end of an IP tunnel that can either access direct Internet compatible services or private network connections. The APN also represents a security mechanism for the network 850, insofar as each mobile device 800 must be assigned to one or more APNs and mobile devices 800 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 850. To maximize use of the PDP Contexts, the network 800 will run an idle timer for each PDP Context to determine if there is a lack of activity. When a mobile device 800 is not using its PDP Context, the PDP Context can be de-allocated and the IP address returned to the IP address pool managed by the DHCP server 1020.

Figure 11:
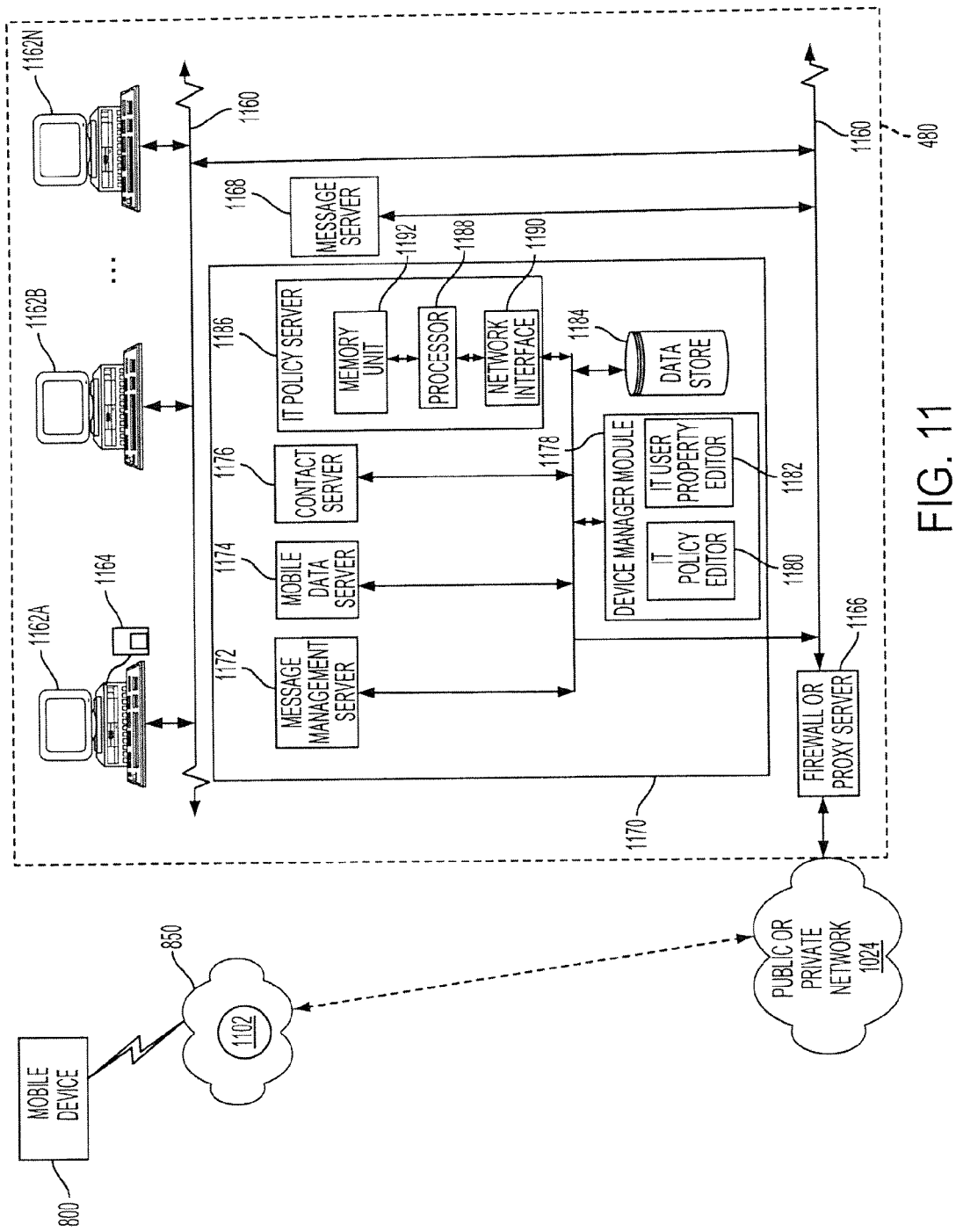
FIG. 11 is a block diagram illustrating components of a host system in one exemplary configuration for use with the wireless network of FIG. 10 and the mobile device of FIG. 8.

Referring to FIG. 11, shown therein is a block diagram illustrating components of an exemplary configuration of a host system 480 that the mobile device 800 can communicate with in conjunction with the connect module 844. The host system 480 will typically be a corporate enterprise or other local area network (LAN), but may also be a home office computer or some other private system, for example, in variant implementations. In this example shown in FIG. 11, the host system 480 is depicted as a LAN of an organization to which a user of the mobile device 800 belongs. Typically, a plurality of mobile devices can communicate wirelessly with the host system 480 through one or more nodes 1002 of the wireless network 850.

The host system 480 comprises a number of network components connected to each other by a network 1160. For instance, a user's desktop computer 1162*a* with an accompanying cradle 1164 for the user's mobile device 800 is situated on a LAN connection. The cradle 1164 for the mobile device 800 can be coupled to the computer 1162*a* by a serial or a Universal Serial Bus (USB) connection, for example. Other user computers 1162*b*-1162*n* are also situated on the network 1160, and each may or may not be equipped with an accompanying cradle 1164. The cradle 1164 facilitates the loading of information (e.g. PIM data, private symmetric encryption keys to facilitate secure communications) from the user computer 1162*a* to the mobile device 800, and may be particularly useful for bulk information updates often performed in initializing the mobile device 800 for use. The information downloaded to the mobile device 800 may include certificates used in the exchange of messages.

It will be understood by persons skilled in the art that the user computers 1162*a*-1162*n* will typically also be connected to other peripheral devices, such as printers, etc. which are not explicitly shown in FIG. 11. Furthermore, only a subset of network components of the host system 480 are shown in FIG. 11 for ease of exposition, and it will be understood by persons skilled in the art that the host system 480 will comprise additional components that are not explicitly shown in FIG. 11 for this exemplary configuration. More generally, the host system 480 may represent a smaller part of a larger network (not shown) of the organization, and may comprise different components and/or be arranged in different topologies than that shown in the exemplary embodiment of FIG. 11.

To facilitate the operation of the mobile device 800 and the wireless communication of messages and message-related data between the mobile device 800 and components of the host system 480, a number of wireless communication support components 1170 can be provided. In some implementations, the wireless communication support components 1170 can include a message management server 1172, a mobile data server 1174, a contact server 1176, and a device manager module 1178. The device manager module 1178 includes an IT Policy editor 1180 and an IT user property editor 1182, as well as other software components for allowing an IT administrator to configure the mobile devices 800. In an alternative embodiment, there may be one editor that provides the functionality of both the IT policy editor 1180 and the IT user property editor 1182. The support components 1170 also include a data store 1184, and an IT policy server 1186. The IT policy server 286 includes a processor 1188, a network interface 1190 and a memory unit 1192. The processor 1188 controls the operation of the IT policy server 1186 and executes functions related to the standardized IT policy as described below. The network interface 1190 allows the IT policy server 1186 to communicate with the various components of the host system 480 and the mobile devices 800. The memory unit 1192 can store functions used in implementing the IT policy as well as related data. Those skilled in the art know how to implement these various components. Other components may also be included as is well known to those skilled in the art. Further, in some implementations, the data store 1184 can be part of any one of the servers.

In this exemplary embodiment, the mobile device 800 communicates with the host system 480 through node 1002 of the wireless network 850 and a shared network infrastructure 1124 such as a service provider network or the public Internet. Access to the host system 480 may be provided through one or more routers (not shown), and computing devices of the host system 480 may operate from behind a firewall or proxy server 1166. The proxy server 1166 provides a secure node and a wireless internet gateway for the host system 480. The proxy server 1166 intelligently routes data to the correct destination server within the host system 480.

In some implementations, the host system 480 can include a wireless VPN router (not shown) to facilitate data exchange between the host system 480 and the mobile device 800. The wireless VPN router allows a VPN connection to be established directly through a specific wireless network to the mobile device 800. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 800 in this alternative implementation.

Messages intended for a user of the mobile device 800 are initially received by a message server 1168 of the host system 480. Such messages may originate from any number of sources. For instance, a message may have been sent by a sender from the computer 1162b within the host system 480, from a different mobile device (not shown) connected to the wireless network 850 or a different wireless network, or from a different computing device, or other device capable of sending messages, via the shared network infrastructure 1124, possibly through an application service provider (ASP) or Internet service provider (ISP), for example.

The message server 1168 typically acts as the primary interface for the exchange of messages, particularly e-mail messages, within the organization and over the shared network infrastructure 1124. Each user in the organization that has been set up to send and receive messages is typically associated with a user account managed by the message server 1168. Some exemplary implementations of the message server 1168 include a Microsoft Exchange™ server, a Lotus Domino™ server, a Novell Groupwise™ server, or another suitable mail server installed in a corporate environment. In some implementations, the host system 480 may comprise multiple message servers 1168. The message server 1168 may also be adapted to provide additional functions beyond message management, including the management of data associated with calendars and task lists, for example.

When messages are received by the message server 1168, they are typically stored in a data store associated with the message server 1168. In at least some embodiments, the data store may be a separate hardware unit, such as data store 1184, that the message server 1168 communicates with. Messages can be subsequently retrieved and delivered to users by accessing the message server 1168. For instance, an e-mail client application operating on a user's computer 1162a may request the e-mail messages associated with that user's account stored on the data store associated with the message server 1168. These messages are then retrieved from the data store and stored locally on the computer 1162a. The data store associated with the message server 1168 can store copies of each message that is locally stored on the mobile device 800. Alternatively, the data store associated with the message server 1168 can store all of the messages for the user of the mobile device 800 and only a smaller number of messages can be stored on the mobile device 800 to conserve memory. For instance, the most recent messages (i.e., those received in the past two to three months for example) can be stored on the mobile device 800.

When operating the mobile device 800, the user may wish to have e-mail messages retrieved for delivery to the mobile device 800. The message application 838 operating on the mobile device 800 may also request messages associated with the user's account from the message server 1168. The message application 838 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 800 is assigned its own e-mail address, and messages addressed specifically to the mobile device 800 are automatically redirected to the mobile device 800 as they are received by the message server 1168.

The message management server 1172 can be used to specifically provide support for the management of messages, such as e-mail messages, that are to be handled by mobile devices. Generally, while messages are still stored on the message server 1168, the message management server 1172 can be used to control when, if, and how messages are sent to the mobile device 800. The message management server 1172 also facilitates the handling of messages composed on the mobile device 800, which are sent to the message server 1168 for subsequent delivery.

For example, the message management server 1172 may monitor the user's "mailbox" (e.g. the message store associated with the user's account on the message server 1168) for new e-mail messages, and apply user-definable filters to new messages to determine if and how the messages are relayed to the user's mobile device 800. The message management server 1172 may also compress and encrypt new messages (e.g. using an encryption technique such as Data Encryption Standard (DES), Triple DES, or Advanced Encryption Standard (AES)) and push them to the mobile device 800 via the shared network infrastructure 1124 and the wireless network 850. The message management server 1172 may also receive messages composed on the mobile device 800 (e.g. encrypted using Triple DES), decrypt and decompress the composed messages, re-format the composed messages if desired so that they will appear to have originated from the user's computer 1162a, and re-route the composed messages to the message server 1168 for delivery.

Certain properties or restrictions associated with messages that are to be sent from and/or received by the mobile device 800 can be defined (e.g. by an administrator in accordance with IT policy) and enforced by the message management server 1172. These may include whether the mobile device 800 may receive encrypted and/or signed messages, minimum encryption key sizes, whether outgoing messages must be encrypted and/or signed, and whether copies of all secure messages sent from the mobile device 800 are to be sent to a pre-defined copy address, for example.

The message management server 1172 may also be adapted to provide other control functions, such as only pushing certain message information or pre-defined portions (e.g. "blocks") of a message stored on the message server 1168 to the mobile device 800. For example, in some cases, when a message is initially retrieved by the mobile device 800 from the message server 1168, the message management server 1172 may push only the first part of a message to the mobile device 800, with the part being of a pre-defined size (e.g. 2 KB). The user can then request that more of the message be delivered in similar-sized blocks by the message management server 1172 to the mobile device 800, possibly up to a maximum pre-defined message size. Accordingly, the message management server 1172 facilitates better control over the type of data and the amount of data that is communicated to the mobile device 800, and can help to minimize potential waste of bandwidth or other resources.

The mobile data server 1174 encompasses any other server that stores information that is relevant to the corporation. The mobile data server 1174 may include, but is not limited to, databases, online data document repositories, customer relationship management (CRM) systems, or enterprise resource planning (ERP) applications.

The contact server 1176 can provide information for a list of contacts for the user in a similar fashion as the address book on the mobile device 800. Accordingly, for a given contact, the contact server 1176 can include the name, phone number, work address and e-mail address of the contact, among other information. The contact server 1176 can also provide a global address list that contains the contact information for all of the contacts associated with the host system 480.

It will be understood by persons skilled in the art that the message management server 1172, the mobile data server 1174, the contact server 1176, the device manager module 1178, the data store 1184 and the IT policy server 1186 do not need to be implemented on separate physical servers within the host system 480. For example, some or all of the functions associated with the message management server 1172 may be integrated with the message server 1168, or some other server in the host system 480. Alternatively, the host system 840 may comprise multiple message management servers 1172, particularly in variant implementations where a large number of mobile devices need to be supported.

Alternatively, in some embodiments, the IT policy server 1186 can provide the IT policy editor 1180, the IT user property editor 1182 and the data store 1184. In some cases, the IT policy server 1186 can also provide the device manager module 1178. The processor 1188 can execute the editors 1180 and 1182. In some cases, the functionality of the editors 1180 and 1182 can be provided by a single editor. In some cases, the memory unit 1192 can provide the data store 1184.

The device manager module 1178 provides an IT administrator with a graphical user interface with which the IT administrator interacts to configure various settings for the mobile devices 800. As mentioned, the IT administrator can use IT policy rules to define behaviors of certain applications on the mobile device 800 that are permitted such as phone, web browser or Instant Messenger use. The IT policy rules can also be used to set specific values for configuration settings that an organization requires on the mobile devices 800 such as auto signature text, WLAN/VoIP/VPN configuration, security requirements (e.g. encryption algorithms, password rules, etc.), specifying themes or applications that are allowed to run on the mobile device 800, and the like.

While preferred embodiments have been specifically described and illustrated herein, it should be apparent that many modifications to the embodiments can be made. For example, while the preferred embodiments illustrated herein have been limited to the processing of voice (packet or circuit switched) calls, it should be readily apparent that any form of call (e.g., audio, video, data) may be processed through server 30 to any communication device (e.g., cellular phone, pager, office/residential landline telephone, computer terminal, personal digital assistant (PDA), RIM device, etc.). The individual method steps of the exemplary operational flows illustrated in FIGS. 6A-6C may be interchanged in order, combined, replaced or even added. Any number of different operations not illustrated herein may be performed. Moreover, the method steps may be performed by hardware, software, firmware or any combinations of hardware, software, firmware or logic elements.

In addition, while the illustrated embodiments have demonstrated implementations using PBX-based communication systems, it should be readily apparent that the server module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the embodiments disclosed do not need a PBX to operate or to perform any of the processing described above. All that is required is a properly programmed server 30.

It should be apparent that, while only PRI lines (e.g., between PBX 14 and server 30, between PBX 14 and PSTN 16) have been illustrated in discussing the preferred embodiments, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in practice. It should be noted that the server 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint/Nextel, etc.) depending on the communication devices registered with the system.

The modules described herein such as the modules making up server 30, as well as server 30 and PBX 14 themselves, may be one or more hardware, software, or hybrid components residing in (or distributed among) one or more local or remote systems. It should be readily apparent that the modules may be combined (e.g., server 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with server 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components.

What is claimed as new and desired to be protected by Letters Patent of the United States is:

1. A method of initiating a data exchange for a non-class A wireless device participating in a voice communication with a second device, the method comprising:
   maintaining a first voice communication leg to the wireless device and a second voice communication leg to the second device;
   receiving a request for the data exchange transmitted from the wireless device during the voice communication on a service other than is used for the data exchange;
   determining whether the wireless device has access rights to initiate the data exchange during the voice communication; and when it is determined that the wireless device has access rights to initiate the data exchange during the voice communication:
: disconnecting the first voice communication leg;
: parking the second voice communication leg;
: waiting for data to be transmitted to or from the wireless device;
: determining that the data exchange is complete;
: establishing a third voice communication leg to the wireless device when it is determined that the data exchange is complete;
: unparking the second voice communication leg; and
: connecting the second and third voice communication legs.

2. The method of claim 1, wherein the request for the data exchange is initiated by the wireless device.

3. The method of claim 1, wherein the step of determining that the data exchange is complete comprises inputting a data exchange complete data message from the server.

4. The method of claim 1, wherein the step of determining that the data exchange is complete comprises inputting a data exchange complete data message from the wireless device.

5. The method of claim 1, wherein the step of determining that the data exchange is complete comprises determining that a predetermined period of time has elapsed since the start of the data exchange.

6. The method of claim 1 further comprising the step of determining whether the wireless device has access rights to the data exchange prior to disconnecting the first voice communication leg.

7. The method of claim 1, wherein the parking step further comprises alerting the user of the second device that the voice communication will be temporarily placed on hold prior to parking the device.

8. A method of initiating a data exchange from a non-class A wireless device participating in a voice communication with a second device, the method comprising:
: maintaining a first voice communication leg to the wireless device and a second voice communication leg to the second device;
: receiving a request for the data exchange transmitted from the wireless device during the voice communication on a service other than is used for the data exchange;
: determining whether the wireless device has access rights to initiate the data exchange during the voice communication; and
: when it is determined that the wireless device has access rights to initiate the data exchange during the voice communication:
:: dropping the first voice communication leg,
:: inputting a data exchange complete indication from the wireless device,
:: establishing a third voice communication leg to the wireless device, and
:: using the third voice communication leg to re-establish the voice communication with the second device.

9. The method of claim 8, wherein the request for the data exchange from the wireless device comprises DTMF tones transmitted from the wireless device.

10. The method of claim 8, wherein the request for the data exchange from the wireless device comprises a Short Message Service message transmitted from the wireless device.

11. The method of claim 8 further comprising the steps of:
: parking the second voice communication leg when it is determined that the wireless device has access rights to initiate the data exchange;
: unparking the second voice communication leg after inputting a data exchange complete indication from the wireless device; and
: connecting the third voice communication leg to the unparked second communication leg to re-establish the voice communication.

12. The method of claim 8 further comprising the steps of:
: dropping the second voice communication leg when it is determined that the wireless device has access rights to initiate the data exchange;
: initiating a fourth voice communication leg to the second device after inputting a data exchange complete indication from the wireless device; and
: connecting the third and fourth voice communication legs to re-establish the voice communication.

13. A telecommunications server configured to initiate a data exchange for a wireless device associated with the server while the wireless device is participating in a voice communication with a second device, the wireless device being a non-class A device, said server comprising:
: a processor configured to:
:: initially maintain the voice communication between the wireless device and the second device,
:: determine that a data exchange is being requested by the wireless device during the voice communication, the request transmitted from the wireless device on a service other than is used for the data exchange,
:: determine whether the wireless device has access rights to initiate the data exchange during the voice communication; and
:: when it is determined that the wireless device has access rights to initiate the data exchange during the voice communication:
::: disable the voice communication between the wireless device and the second device,
::: wait for data to be transmitted to the wireless device,
::: determine when the data exchange is complete, and
::: re-establish voice communication between the wireless device and the second device when it is determined that the data exchange is complete.

14. The server of claim 13, wherein the processor is configured to determine that the data exchange is complete by being configured to input a data exchange complete data message from the wireless device.

15. The server of claim 13, wherein the processor is configured to determine that the data exchange is complete by being configured to determine that a predetermined period of time has elapsed since the start of the data exchange.

16. The server of claim 13 wherein the processor is configured to determine whether the wireless device has access rights to the data exchange prior to alerting the wireless device of the data exchange request.

17. The server of claim 13, wherein the processor is configured to determine whether the wireless device will accept the data exchange by being configured to input DTMF tones transmitted from the wireless device.

18. The server of claim 13, wherein the processor is configured to determine whether the wireless device will accept the data exchange by being configured to input a Short Message Service message transmitted from the wireless device.

19. The server of claim 13, wherein the processor is configured to disable the voice communication between the wireless device and the second device by dropping a first communication leg between the processor and the wireless device and parking a second communication leg between the processor and the second device.

* * * * *